United States Patent [19]
Amano

[11] Patent Number: 5,852,272
[45] Date of Patent: Dec. 22, 1998

[54] WEAR-RESISTANT OVERLAY FORMING METHOD AND WEAR-RESISTANT COMPOSITE MEMBERS

[75] Inventor: Masaharu Amano, Hirakata, Japan

[73] Assignee: Komatsu Ltd., Tokyo, Japan

[21] Appl. No.: 624,554

[22] PCT Filed: Jul. 31, 1995

[86] PCT No.: PCT/JP95/01522

§ 371 Date: Apr. 2, 1996

§ 102(e) Date: Apr. 2, 1996

[87] PCT Pub. No.: WO96/04097

PCT Pub. Date: Feb. 15, 1996

[30] Foreign Application Priority Data

Aug. 2, 1994 [JP] Japan .................................. 6-201410
Aug. 11, 1994 [JP] Japan .................................. 6-189614

[51] Int. Cl.⁶ .................................................... B23K 9/04
[52] U.S. Cl. ........................................ 219/76.14; 37/460
[58] Field of Search ........................... 219/76.14, 76.1, 219/76.15, 77; 37/460; 428/681

[56] References Cited

U.S. PATENT DOCUMENTS

| | | | |
|---|---|---|---|
| 1,922,917 | 8/1933 | Russell et al. | 37/460 |
| 2,709,213 | 5/1955 | Gibson | 219/76.15 |
| 2,841,687 | 7/1958 | Richter | 219/76.15 |
| 3,405,247 | 10/1968 | Hlivka | 219/76.15 |
| 3,766,364 | 10/1973 | Krecioch et al. | |
| 4,097,711 | 6/1978 | Banerjee | 219/76.15 |
| 4,243,727 | 1/1981 | Wisler et al. | 219/76.15 |
| 4,666,797 | 5/1987 | Newman et al. | 428/681 |
| 4,837,417 | 6/1989 | Funk | 219/76.12 |
| 5,111,600 | 5/1992 | Lukavich et al. | 37/460 |

FOREIGN PATENT DOCUMENTS

| | | |
|---|---|---|
| 49-14349 | 2/1974 | Japan . |
| 57-103784 | 6/1982 | Japan . |
| 02006097 A | 1/1990 | Japan . |
| 6-218544 | 8/1994 | Japan . |

*Primary Examiner*—Clifford C. Shaw
*Attorney, Agent, or Firm*—Millen, White, Zelano & Branigan, P.C.

[57] ABSTRACT

A wear-resistant overlay forming method wherein hard particles are supplied to a molten weld pool that is formed on a base material by an arc generated from an arc electrode to form a wear-resistant overlay containing hard particles on the base material, and wherein the hard particles are supplied to part of molten metal of the molten weld pool, the part being raised by the arc or flowing down owing to gravity. A wear-resistant composite member for cutting and removing rock and sand is designed such that the hard-facing deposit layers containing the hard particles are formed on the base material in a stripe pattern so as to run in the direction of friction produced by rock and sand or such that the hard-facing deposit layers containing the hard particles and soft-facing deposit layers made from soft material are formed on the base material in a stripe pattern so as to run in the direction transverse to the direction of friction produced by rock and sand, being alternately aligned in the direction of friction.

12 Claims, 25 Drawing Sheets

——— INITIAL SHAPE
- - - - SHAPE OF WEAR

——— INITIAL SHAPE
——·——·— SHAPE OF WEAR

—— INITIAL SHAPE
----- SHAPE OF WEAR

— INITIAL SHAPE
— · — · — SHAPE OF WEAR

⇩ TURN AROUND

WEAR-RESISTANT OVERLAY FORMING METHOD AND WEAR-RESISTANT COMPOSITE MEMBERS

TECHNICAL FIELD

The present invention relates to wear-resistant overlay forming methods for readily and efficiently giving wear resistance to parts which are locally subjected to wear such as a cutting edge of a wheeled loader, a ripper point of a bulldozer and a bucket tooth of a hydraulic shovel, and the invention also relates to wear-resistant composite members used for such parts.

BACKGROUND ART

For giving wear resistance to a part which is locally subjected to wear such as a cutting edge, ripper point and bucket tooth, a wear-resistant overlay having a composite structure constituted by a metal matrix (soft basis), hard particles and others is formed on a base material by an overlaying welding method, as disclosed, for instance, in Japanese Patent Publication Laid-Open No. 2-6097 (1990). Generally, hard particles are sprayed to and mixed with a molten weld pool formed on the base material during welding as described in the above publication in order to form such a wear-resistant overlay. This method however presents the problem that if the hard particles have higher density than the molten metal, the hard particles will precipitate in the molten weld pool, resulting in formation of a wear-resistant overlay within which the hard particles are not uniformly dispersed so that good wear resistance cannot be achieved.

If a conventional ripper point 100 for bulldozers is used for a long time, tip 103 composed of a top face 101 and a bottom face 102 which meet each other will be worn out as shown in FIG. 29(*a*). Therefore, the ripper point 100 having a ground-contacting section 104 which has been worn out and rounded as shown in FIG. 29(*b*) is usually used by turning it around as shown in FIG. 29(*c*). This turning operation decreases efficiency in digging operation.

The invention has been made to overcome the foregoing drawbacks, and one of the objects of the invention is therefore to provide wear-resistant overlay forming methods capable of forming a wear-resistant overlay in which hard particles are uniformly dispersed and capable of giving desired excellent wear resistance.

Another object of the invention is to provide wear-resistant composite members having high digging efficiency which ensure good penetration strength relative to the ground uniform when they are used for a long period, and ensure long service life.

DISCLOSURE OF THE INVENTION

The above objects can be accomplished by a wear-resistant overlay forming method according to the invention wherein hard particles are supplied to a molten weld pool that is formed on a base material by an arc generated from an arc electrode to form a wear-resistant overlay containing the hard particles on the base material, and wherein the hard particles are supplied to part of molten metal of the molten weld pool, the part being raised by the arc.

According to the invention, hard particles are supplied to part of the molten metal of the molten weld pool that is formed during arc welding, the part being raised by an arc. This allows the part of the molten metal to be solidified without precipitation of the hard particles in the molten weld pool so that the hard particles are uniformly dispersed in the resultant overlay to be obtained after solidification.

In the above wear-resistant overlay forming method of the invention, when an overlay is formed on the surface of the base material under the conditions that the surface of the base material is inclined in a welding direction at an angle α which ranges from not less than 0° to less than 25° with respect to a horizontal plane, the preferable arrangement is as follows: the tip of the arc electrode is inclined in relation to the surface of the base material so as to face in the direction opposite to the welding direction; and the hard particles are supplied to the part of the molten metal of the molten weld pool being raised by the arc, the part supplied with the hard particles being located behind an intersecting position in the welding direction, the intersecting position being where the extension of the tip of the arc electrode intersects the surface of the base material. The part of the molten metal of the molten weld pool being raised by the arc behind the intersecting position in the welding direction is accordingly supplied with the hard particles and the molten metal is solidified with most of the hard particles not being precipitated within the molten weld pool. As a result, a wear-resistant overlay in which the hard particles are uniformly dispersed can be obtained (overlaying method 1). Note that the aforesaid welding direction may be an upward direction or downward direction.

According to the invention, there is provided another wear-resistant overlay forming method wherein hard particles are supplied to a molten weld pool that is formed on a base material by an arc generated from an arc electrode to form a wear-resistant over-lay containing the hard particles on the base material, and wherein the hard particles are supplied to part of molten metal of the molten weld pool, the part flowing down owing to gravity.

In the above method, the hard particles are supplied to the part of the molten metal of the molten weld pool which is flowing down owing to gravity. With this arrangement, the part of the molten metal is solidified without precipitation of the hard particles in the molten weld pool so that the resultant overlay obtained after solidification has the hard particles uniformly dispersed therein.

In the above wear-resistant overlay forming method of the invention, when an overlay is formed on the surface of the base material under the conditions that the surface of the base material is inclined in a welding direction (in this case, the welding direction is an upward direction) at an angle α which ranges from not less than 25° to less than 90° with respect to a horizontal plane, the preferable arrangement is as follows: the tip of the arc electrode is inclined so as to be at right angles to the surface of the base material or so as to face in the welding direction; and the hard particles are supplied to the part of the molten metal of the molten weld pool flowing down owing to gravity, the part supplied with the hard particles being located ahead of (i.e, above) an intersecting position in the welding direction, the intersecting position being where the extension of the tip of the arc electrode intersects the surface of the base material. The part of the molten metal of the molten weld pool which is flowing down owing to gravity is accordingly supplied with the hard particles so that the hard particles do not precipitate within the molten weld pool and the part of the molten metal is solidified. This produces a wear-resistant overlay in which the hard particles are uniformly dispersed. (overlaying method 2)

When formation of an overlay is performed with the surface of the base material disposed upright, it is preferable that the welding direction be an upward direction along the surface of the base material; that the tip of the arc electrode be inclined relative to the surface of the base material so as to face in the welding direction; and that the hard particles be supplied to the part of molten metal of the molten weld pool, the part flowing down owing to gravity and being located at an intersecting position where the extension of the tip of the arc electrode intersects the surface of the base material. The molten metal of this embodiment in which the base material stands upright flows down more easily than that of the embodiment in which the surface of the base material is inclined at an angle α which ranges from not less than 25° to less than 90° as above-described, and therefore the feeding position of the hard particles in the former embodiment is arranged at a slightly lower position. The hard particles are thus fed to the part of the molten metal of the molten weld pool which is flowing down owing to gravity and therefore do not precipitate within the molten weld pool similarly to the other embodiments so that an overlay having the hard particles uniformly dispersed therein can be obtained after solidification. (overlaying method 3)

In the above-described wear-resistant overlay forming methods of the invention, the tip of the arc electrode is inclined in a specified direction or disposed at right angles relative to the surface of the base material. The angle of the tip of the arc electrode relative to the surface of the base material affects the resultant overlay. The reason for this is considered to be due to the fact that the raised or flowing-down condition of the molten metal and the penetrating condition of the base material vary according to the direction of the current of plasma generated from the arc electrode and according to the action of the gravity and surface tension of the molten metal of the molten weld pool, so that the finished condition of the resultant overlay varies. For example, in cases where the surface of the base material on which an overlay is to be formed is placed horizontally, the tip of the arc electrode is preferably inclined in the welding direction at an angle θ of 20° to 45° with respect to the direction perpendicular to the surface of the base material (i.e., the torch angle θ is 20° to 45°). If the torch angle θ is less than 20°, the satisfactory raising action by the arc cannot be obtained and the penetration of the hard particles into the base material becomes shallow, which sometimes results in defective fusion. If the torch angle θ exceeds 45°, on the other hand, the arc tends to be unstable or the quantity of large weld spatters (weld spatters are caused by the molten metal of the molten weld pool which is blown away) tends to increase undesirably. In cases where the surface of the base material is upright, the tip of the arc electrode is preferably inclined at an angle θ of 10° to 20° with respect to the direction perpendicular to the surface of the base material so as to face in the same direction as the welding direction (i.e., the torch angle θ is −10° to −20°). If the torch angle θ is less than −20°, the arc tends to be unstable or the quantity of large weld spatters increases. If it exceeds −10°, the molten metal of the molten weld pool tends to run and drip excessively, resulting in formation of a defective overlay. When the value of the torch angle is plus, the arc electrode faces in a backward direction with respect to the welding direction, and therefore, the torch angle in this case is often called "sweep-back angle".

The preferred range of the torch angle varies depending on the degree of the inclination of the surface of the base material. The relationship between the preferred range of the torch angle θ and the inclination angle α of the surface of the base material in relation to the horizontal plane is shown in the graph of FIG. 1(a). FIG. 1(b) diagrammatically shows the relationship between the torch angle θ and the inclination angle α. When the value of the torch angle is plus, the arc electrode is inclined from the direction perpendicular to the surface of the base material towards the welding direction (with the tip of the arc electrode facing in the opposite direction to the welding direction) and when the value of the torch angle is minus, the arc electrode is inclined from the direction perpendicular to the surface of the base material towards the opposite direction to the welding direction (with the tip of the arc electrode facing in the welding direction).

To supply the hard particles, a nozzle is often used in the wear-resistant overlay forming methods of the invention. This nozzle is preferably designed to weave in the welding direction to provide a uniform supply of the hard particles.

According to the wear-resistant overlay forming methods of the invention, the hard particles are fed to the molten metal of the molten weld pool composed of molten weld metal and molten base material, as mentioned earlier and second particles may be fed in addition to the hard particles if necessary. The preferred density of the hard particles is not less than one-half the density of the molten metal of the molten weld pool. If the density of the hard particles is less than one-half, the hard particles will float on the surface of the molten metal pool and will be exposed from the surface of the overlay to be obtained after solidification. As a result, the hard particles becomes liable to separation from the resultant overlay. To avoid such undesirable floating of the hard particles, the density of the hard particles should be equal to or exceeding the density of the molten metal of the molten weld pool. When the density of the hard particles is equal to or exceeding the density of the molten metal, the hard particles are uniformly dispersed in the molten metal. In addition, hard particles having good wettability relative to the molten metal are preferred in terms of insusceptibility to such separation. Bear the fact in mind that the more the density of the hard particles increases, the more easily the hard particles precipitate within the molten weld pool. Therefore, when the density of the hard particles exceeds the density of the molten metal, it is preferable that the second particles be fed to the molten metal of the molten weld pool in addition to the hard particles. The second particles catch and stop the coming-down hard particles so that the hard particles can be prevented from being deposited at the bottom of the molten weld pool, which facilitates uniform dispersion of the hard particles.

The second particles have the following effects in addition to receiving the coming-down hard particles.

(1) The temperature of the molten weld pool can be decreased, leading to an increase in the viscosity of the molten metal. Further, the time required for solidification can be reduced so that precipitation of the hard particles can be prevented.

(2) The time required for solidification can be reduced by decreasing the temperature of the molten weld pool, thereby to restrict the dissolution and degeneration of the hard particles.

(3) Welding amount can be increased by the volume of the second particles mixed, so that welding speed can be increased.

(4) The composition of the overlay can be controlled by adjusting the quality and quantity of the second particles. This enables it to control the hardness, toughness, brittleness and other features of the resultant overlay.

The hard particles are a component for imparting wear resistance to the overlay, and therefore preferably have a higher melting point than that of the molten metal so as not to be melted when supplied to the molten weld pool. Similarly, preferred second particles have a higher melting point than the molten metal in order to attain the above-described functions to prevent precipitation of the hard particles. Preferably, the hard particles and the second particles both have good wettability relative to the molten metal and can bind firmly to the molten metal.

In consideration of the above requirements for the preferred hard particles and second particles, preferred combinations (that are also used in practice) of the hard particles and the second particles for the weld metal are shown in Table 1. In the case of the combinations shown in Table 1, when the weld metal is an aluminum alloy, an aluminum alloy or copper alloy is used as the base material. When the weld metal is an iron alloy, nickel alloy, cobalt alloy or copper alloy, the base material is an iron alloy, nickel alloy or cobalt alloy. These combinations shown here are merely representative of the invention and should not be considered to limit the scope of the invention.

TABLE 1

| WELD METAL | | (1) Al, Al alloy |
|---|---|---|
| HARD PARTICLES | $dM \leq dp1$ | (Nb—, Cr—, Mo—, W—) boride (Si—, Al—) oxide Cermet composed of the above ceramics and metal (binder phase) containing, as a chief component, one of (Al, Cu, Ni, Fe, Ti, Si) |
| | $0.5dM \leq dp1$ | When the weld metal is an Al—Si alloy, (Ti—, Zr—, Hf—, V—, Nb—, Ta—, Cr—, Mo—, W—) carbide, and cermet composed of carbide and metal (binder—phase) containing as a chief component one of (Al, Cu, Ni, Fe, Ti, Si). |
| SECOND PARTICLES | Most particles are melted | Al Alloy containing Al as a chief component, and one or a plurality of components selected from the group of (Li, Mg, Zn, Sn, Si, Be, Mn) |
| | Unmelted parts remain ($dM \leq dp2$) | The above hard particles Alloy containing as a chief component one of (Cu, Ni, Fe, Ti, Si) |

(Foot Note)
dM: Density of molten metal composed of weld metal and base material
dpl: Density of hard particles
dp2: Density of second particles

TABLE 2

| WELD METAL | | (2) Fe, Fe alloy |
|---|---|---|
| HARD PARTICLES | $dM \leq dp1$ | (Mo—, Ta—, W—) boride (Nb—, Hf—) nitride (Nb—, Mo—, Hf—, Ta—, W—) carbide Cermet composed of the above ceramics and metal (binder phase) containing as a chief component one of (Fe, Ni, Co, Cr, Cu) |
| | $0.5dM \leq dp1$ | (V—, Cr—, Nb—) boride (Ti—, V—, Cr—, Zr—) nitride (Ti—, V—, Cr—, Zr—) carbide Cermet composed of the above ceramics and metal (binder phase) containing as a chief component one of (Fe, Ni, Co, Cr, Cu) |

TABLE 2-continued

| WELD METAL | | (2) Fe, Fe alloy |
|---|---|---|
| SECOND PARTICLES | Most particles are melted | Fe Ni Co Alloy containing one of (Fe, Ni, Co, Cr, Cu) as a chief component |
| | Unmelted parts remain ($dM \leq dp2$) | (Mo—, Ta—, W—) boride (Nb—, Hf—) nitride (Nb—, Mo—, Hf—, Ta—, W—) carbide |

TABLE 3

| WELD METAL | | (3) Ni, Ni alloy |
|---|---|---|
| HARD PARTICLES | $dM \leq dp1$ | (Mo—, Ta—) boride Hf nitride (Nb—, Mo—, Hf—, Ta—, W—) carbide Cermet composed of the above ceramics and metal (binder phase) containing as a chief component one of (Fe, Ni, Co, Cr, Cu) |
| | $0.5dM \leq dp1$ | (Ti—, V—, Cr—, Zr—) boride (Ti—, V—, Zr—) nitride (Ti—, V—, Cr—, Zr—) carbide Cermet composed of the above ceramics and metal (binder phase) containing as a chief component one of (Fe, Ni, Co, Cr, Cu) |
| SECOND PARTICLES | Most particles are melted | Fe Ni Co Alloy containing one of (Fe, Ni, Co, Cr, Cu) as a chief component |
| | Unmelted parts remain ($dM \leq dp2$) | (Mo—, Ta—) boride Hf nitride (Nb—, Mo—, Hf—, Ta—, W—) carbide |

TABLE 4

| WELD METAL | | (4) Co, Co alloy |
|---|---|---|
| HARD PARTICLES | $dM \leq dp1$ | (Mo—, Hf—, Ta—) boride (Nb—, Hf—) nitride (Nb—, Mo—, Hf—, Ta—, W—) carbide Cermet composed of the above ceramics and metal (binder phase) containing as a chief component one of (Fe, Ni, Co, Cr, Cu) |
| | $0.5dM \leq dp1$ | (Ti—, V—, Cr—, Zr—, Nb—) boride (Ti—, V—, Cr—, Zr—) nitride (Ti—, V—, Cr—, Zr—) carbide Cermet composed of the above ceramics and metal (binder phase) containing as a chief component one of (Fe, Ni, Co, Cr, Cu) |
| SECOND PARTICLES | Most particles are melted | Fe Ni Co Alloy containing one of (Fe, Ni, Co, Cr, Cu) as a chief component |
| | Unmelted parts remain ($dM \leq dp2$) | (Mo—, Hf—, Ta—) boride (Nb—, Hf—) nitride (Nb—, Mo—, Hf—, Ta—, W—) carbide |

TABLE 5

| WELD METAL | | (5) Cu, Cu alloy |
|---|---|---|
| HARD PARTICLES | dM ≦ dp1 | (Nb—, Ta—, Mo—, W—) carbide Cermet composed of the above ceramics and metal (binder phase) containing as a chief component one of (Cu, Fe, Co, Ni) |
| | 0.5dM ≦ dp1 | (Zr—, Cr—) boride Cr nitride (Ti—, Zr—, V—, Cr—) carbide Cermet composed of the above ceramics and metal (binder phase) containing as a chief component one of (Cu, Fe, Co, Ni) |
| SECOND PARTICLES | Most particles are melted | Cu Alloy containing Cu as a chief component and one or a plurality of components selected from the group of (Al, Ti, Sn, Mn, Zn, Fe, Pb, Ni, P) |
| | Unmelted parts remain (dM ≦ dp2) | (Nb—, Ta—, Mo—, W—) carbide Alloy containing one of (Fe, Co, Ni) as a chief component |

The hard particles and the second particles should meet the standard requirements as additives for overlays. Concretely, the particle diameter of the hard particles should be 0.5 to 5 mm, and more preferably, 0.5 to 2.5 mm. The hardness of the hard particles should be 500 to 2,000 Hv, and more preferably, 1,000 to 1,800 Hv. The second particles should have a particle diameter of 0.5 to 5 mm and the preferable particle diameter is 0.5 to 2.5 mm. The amount of the hard particles to be added should be 5 to 55% by volume, and more preferably, 15 to 45% by volume with respect to the weld metal. If this amount exceeds 55% by volume, there often occur defects in the fusion of the weld metal with base material as well as in the fusion of the hard particles with weld metal and base material, which leads to possible chipping or peeling of the resultant overlay when it is in use. If the amount is less than 5% by volume, the distribution of the hard particles will not be uniform, resulting in a failure in achieving stable wear resistance in the resultant overlay. The total amount of the hard particles and second particles to be added should be no more than 60% by volume, and more preferably, no more than 50% by volume with respect to the weld metal. If the total amount exceeds 60% by volume, it tends to cause defects in the fusion of the weld metal with base material and in the fusion of the hard particles and second particles with weld metal and base material.

With the above-described wear-resistant overlay forming methods according to the invention, a wear-resistant composite member for cutting and removing rock and sand can be obtained, in which wear-resistant hard-facing deposit layers containing the hard particles are formed in a stripe pattern on the base material so as to run in the direction in which friction due to rock and sand is produced (stripe-patterned overlay).

The wear-resistant composite member exhibits excellent wear resistance in its hard-facing deposit layers by virtue of the uniformly dispersed hard particles. In addition, the stripe pattern in which the hard-facing deposit layers are formed in the direction of friction produced by rock and sand allows rock and sand to pass through the cavities between the stripes (i.e., the layers) while rock and sand are being cut and removed, which lessens impacts to be imposed on the stripe-patterned hard-facing deposit layers, preventing them from chipping off.

It is also possible to obtain a wear-resistant composite member for cutting and removing rock and sand, in which hard-facing deposit layer(s) containing hard particles formed with the wear-resistant overlay forming methods of the invention and soft-facing deposit layer(s) made from soft material are formed on the base material so as to run in the direction transverse to the direction of friction produced by rock and sand, being alternately aligned in the direction of friction to form a stripe pattern (alternate overlay A). This wear-resistant composite member is designed to have a top face and a bottom face which meet each other at the tip to form a digging edge and used for cutting and removing rock and sand. On at least either the top face or bottom face of the wear-resistant composite member, there is provided a wear-resistant overlay which extends backward from the digging edge and in which the hard-facing deposit layer(s) and soft-facing deposit layer(s) run in the direction transverse to the direction of friction produced by rock and sand, being aligned alternately in the direction of friction to form a stripe pattern.

A wear-resistant composite member for cutting and removing rock and sand can be obtained, in which hard-facing deposit layer(s) containing hard particles formed with the wear-resistant overlay forming methods of the invention and soft-facing deposit layer(s) made from soft material are formed on the base material so as to run in the direction of friction produced by rock and sand, being aligned alternately in the direction transverse to the direction of friction to form a stripe pattern (alternate overlay B). This wear-resistant composite member is used for cutting and removing rock and sand and designed to have a top face and a bottom face which meet each other at the tip to form a digging edge. On at least either the top face or bottom face of the wear-resistant composite member, there is provided a wear-resistant overlay which extends backward from the digging edge and in which the hard-facing deposit layer(s) and soft-facing deposit layer(s) run in the direction of friction produced by rock and sand, being aligned alternately in the direction transverse to the direction of friction to form a stripe pattern.

The shape of wear in such wear-resistant composite members used for cutting and removing rock and sand varies depending on the size of rock and sand. When working with small-sized rock and sand, scratching (erosion) occurs. Scratching develops to grinding and then to gouging as the size of rock and sand increases. When scratching and grinding mainly occur, hard material is generally required since harder material has better wear resistance. When grinding and gouging mainly occur, material having good toughness is preferred, since hard material is likely to be chipped. Taking these points into account, hard particles may be combined with a tough matrix to produce a wear-resistant composite member useful in a wide range of applications. However, such a composite member produced by simply mixing hard particles with a tough matrix fails in satisfactorily coping with cases where the size distribution of rock and sand is not uniform but concentrated on either small sizes or large sizes.

For cases where the size distribution of rock and sand is concentrated on small sizes, there is provided the above-described wear-resistant composite member in which hard-facing deposit layer(s) containing hard particles and soft-facing deposit layer(s) made from soft material are alternately aligned in the direction of friction produced by rock and sand (i.e., alternate overlay A). Generally, sand having a small particle diameter tends to cause wear in soft-facing deposit layer(s) in preference to other areas. As described earlier, the soft-facing deposit layer(s) and hard-facing deposit layer(s) are arranged alternately in the direction of friction produced by rock and sand, so that the soft-facing deposit layer(s) is protected by the hard-facing deposit layer(s), and the hard-facing deposit layer(s) mainly grinds sand of small particle-diameter effectively. With this arrangement, cutting and removal of rock and sand can be performed with high efficiency and the service life of the wear-resistant composite member can be prolonged. In addition, if large-sized rock which may be contained in small amounts impacts against the hard-facing deposit layer (s), the impact on the hard-facing deposit layer(s) is lessened by the soft-facing deposit layer(s) so that damage to the hard-facing deposit layer(s) can be prevented.

For cases where the size distribution of rock and sand is concentrated on large sizes, there is provided the above-described wear-resistant composite member in which hard-facing deposit layer(s) containing hard particles and soft-facing deposit layer(s) made from soft material are alternately aligned in the direction transverse to the direction of friction produced by rock and sand (alternate overlay B). Generally, rock having a large particle-diameter is likely to have great impact on hard-facing deposit layer(s) causing damage thereto, as above-discussed. However, the alternate overlay B has hard-facing deposit layer(s) arranged in a strip pattern so as to run in the direction of friction produced by rock and sand and therefore is unlikely to receive great impact on its hard-facing deposit layer(s). The soft-facing deposit layer(s) arranged similarly in a strip pattern receive and lessen the impact of rocks of large particle-size.

The alternate overlay B having alternate overlay arrangement in the direction transverse to the direction of friction produced by rock and sand and the alternate overlay A having alternate overlay arrangement in the direction of friction both have the advantages that the hard-facing deposit layer(s) containing the hard particles is supported thanks to the toughness deformability of the soft-facing deposit layer(s), and that the hard-facing deposit layer(s) hardly get damaged since the direct impact of rock and sand on this hard-facing deposit layer(s) is reduced.

FIG. 2(a) shows one example of overlay patterns for the wear-resistant composite member (alternate overlay A) designed to work in rock and sand of which size distribution is concentrated on small sizes (average size $D \leq 15$ cm). FIG. 2(a) is a diagrammatic sectional view of an overlay and FIG. 2(b) is a graph showing the size distribution of rock and sand. FIG. 3(a) shows one example of overlay patterns for the wear-resistant composite member (alternate overlay B) designed to work in rock and sand of which size distribution is concentrated on large sizes (average size $D \geq 15$ cm). FIG. 3(a) is a diagrammatic sectional view of an overlay while FIG. 3(b) is a graph showing the size distribution of rock and sand.

Preferably, the hard-facing deposit layers A are first formed and then the soft-facing deposit layers B are formed such that the cross section of each hard-facing deposit layer A is in the form of a trapezoid with the upper side shorter than the lower side while the cross section of each soft-facing deposit layer B is in the form of a trapezoid with the upper side longer than the lower side. This arrangement is made for the purpose that the hard-facing deposit layers A are supported and protected by plastic deformability of the soft-facing deposit layers B. Even if formation of the soft-facing deposit layers B is done first and followed by formation of the hard-facing deposit layers A, rock cannot impact against the hard-facing deposit layers A from their sides because spaces between the hard-facing deposit layers A are filled with metal, and accordingly, improved impact resistance can be ensured. The width WA of the hard-facing deposit layers A is preferably twice or more the width WB of the soft-facing deposit layers B in order to obtain satisfactory wear resistance. Note that the widths WA and WB are the widths of the middle parts of the deposit layers A and B, respectively. Especially, in the case of the alternate overlay B shown in FIG. 3(a), the width WB is preferably smaller than the average size D of rock and sand for the reason that if the width WB exceeds the average size D of rock and sand, the wear of the soft-facing deposit layers B will be speeded up.

It is also possible to carry out overlaying in such a way that the hard-facing deposit layer(s) containing hard particles is first over-laid and then the soft-facing deposit layer(s) is formed such that the hard particles are dissolved out from the hard-facing deposit layer(s), flowing into the soft-facing deposit layer(s) (hard particle dissolving-out overlay).

By overlaying in the above order, not only can the hard-facing deposit layer(s) have superior wear resistance due to uniform dispersion of the hard particles, but also can the soft-facing deposit layer(s) have hardness that is increased by the hard particles having penetrated therein besides toughness. Therefore, when digging the ground which contains fine particles such as sand soil, the soft-facing deposit layer(s) supports the hard-facing deposit layer(s) as described earlier and such an undesirable situation that only the soft-facing deposit layer(s) is worn out can be prevented.

As the hard particles contained in the hard-facing deposit layer, recycled particles made by crushing used cutting tools such as cutting chippers and drills may be used. Since these cutting tools contain hard particles, the particles obtained by crushing such cutting tools are very useful to impart wear resistance to the wear-resistant composite member. Further, the production cost can be saved since recycled material is utilized.

Such recycled particles are made, for example, by any of the following methods.

(1) Used cutting tools placed on a conductive supporting member are heated by arc discharge and then cooled to form cracks or brittle phases therein. The cutting tools having cracks or brittle phases are mounted on a striking section of a pressing crusher and crushed.

(2) Used cutting tools placed on a supporting member are heated by irradiating laser beam and then cooled to form cracks or brittle phases therein. These cutting tools are then crushed in a similar way to the method (1).

(3) Used cutting tools placed on a conductive supporting member which functions as one electrodes are heated by energy discharged from another electrode and then cooled to form cracks or brittle phases therein. These cutting tools are then crushed in a similar way to the method (1).

The pretreatments described in the above examples are performed in order to facilitate crushing of the used cutting tools, and it is therefore also possible to crush the cutting tools without subjecting these tools to pretreatments to produce hard particles (i.e., recycled particles).

The foregoing objects can be achieved by a wear-resistant composite member for cutting and removing rock and sand according to the invention wherein a top face and a bottom face meet each other at the tip to form a digging edge, and wherein a wear-resistant overlay is formed on at least at a part of the top face so as to extend backward from the digging edge. In the wear-resistant composite member of the invention, a wear-resistant overlay is formed on the top face so as to extend backward from the digging edge. When digging operation is carried out with such a wear-resistant composite member, the tip of this wear-resistant overlay provide a sharp digging edge at all times, and penetration of the wear-resistant composite member into the ground can be always kept in good condition. In addition, the wear-resistant composite member of the invention does not need to be turned around unlike in the prior art, and therefore efficiency in digging operation will not be deteriorated.

In the wear-resistant composite member of the invention, the wear-resistant overlay, which is formed on at least at a part of the top face and extending backward from the digging edge, may be formed in areas other than both lateral sides of the top face, or it may be formed at either side of the top face. The wear-resistant overlay which extends backward from the digging edge may be formed on a protuberance which is positioned on the top face of the wear-resistant composite member and extending backward from the digging edge. This makes the protuberance thicker than compared to other parts, and that a wear-resistant overlay is formed on the protuberance, the protuberance is made more insusceptible to wear than other parts so that it is kept in a conical shape, running along the wear-resistant overlay which extends backward from the digging edge. Further, the bottom face of the wear-resistant composite member may be provided with a protuberance which also extends backward from the digging edge, being located in a position corresponding to the protuberance formed on the top face. This protuberance formed on the bottom face serves as wear allowance, permitting the conical shape to last for a long time.

The wear-resistant overlay which is located in areas other than both sides of the top face and extending backward from the digging edge may be formed within a groove which is also formed on the top face of the wear-resistant composite member, extending backward from the digging edge. This makes both sides of the top face thicker and more unlikely to wear away than other areas so that the wear-resistant composite member has a spade-like shape which is suitable for digging the ground. The bottom face of such a composite member may be provided with a protuberance which extends backward from the digging edge, being located in a position corresponding to the groove formed on the top face. This protuberance on the bottom face serves as wear allowance so that the wear-resistant composite member can be used for a long time, being kept in a spade shape.

The wear-resistant composite member may be formed such that the wear-resistant overlay has hard-facing deposit layer(s) containing hard particles and soft-facing deposit layer(s) made from soft material which run in the direction transverse to the direction of friction produced by rock and sand, being aligned alternately in the direction of friction to form a stripe pattern (alternate overlay A). It is also possible to form the wear-resistant composite member such that the wear-resistant overlay has hard-facing deposit layer(s) containing hard particles and soft-facing deposit layer(s) made from soft material which run in the direction of friction produced by rock and sand, being aligned alternately in the direction transverse to the direction of friction to form a stripe pattern (alternate overlay B). The respective effects of these alternate overlays A and B have been described earlier.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1(a) and 1(b) are associated with a phenomenon related to the principle of wear-resistant overlay forming methods according to the invention, wherein FIG. 1(a) is a graph showing the relationship between a preferred range of torch angle θ and an inclination angle α of a surface of a base material relative to a horizontal plane, and FIG. 1(b) is an explanatory diagram showing the relationship between the torch angle θ and inclination angle α, FIGS. 2(a) 2(b), 3(a) and 3(b) show overlay patterns for wear-resistant composite members according to the invention, wherein FIG. 2(a) is a diagrammatic sectional view of an overlay pattern according to one example, and FIG. 2(b) is a graph showing the size distribution of rock and sand according to the example, FIG. 3(a) is a diagrammatic sectional view of an overlay pattern according to another example, and FIG. 3(b) is a graph showing the size distribution of rock and sand according to the second example, FIGS. 4 to 6 illustrate the principle of the wear-resistant overlay forming methods according to the invention, wherein FIG. 4 is a diagrammatic illustration of an overlay formation mechanism according to Example 1 employed when the inclination angle of a base material is not less than 0° to less than 25°, FIG. 5 is a diagrammatic illustration of an overlay formation mechanism employed in Example 2 when the inclination angle of a base material is not less than 25° to less than 90°, FIG. 6 is a diagrammatic illustration of an overlay formation mechanism according to Example 3 employed when a base material is disposed upright, FIGS. 12(a) to 12(d) show overlay patterns for a bucket tooth for hydraulic shovels, wherein FIG. 12(a) is a perspective view of a tooth on which only hard-facing deposit layers prepared in Comparative Example 3 are formed, FIG. 12(b) is a perspective view of a tooth on which hard-facing deposit layers and soft-facing deposit layers prepared in Example 6 are alternately overlaid, FIG. 12(c) is a sectional view taken in the direction of the arrows of FIG. 12(b), and FIG. 12(d) is a wear diagram of the tooth shown in FIG. 12(b), FIGS. 14(a) and 14(b) show the shape of wear in the samples after conducting tests, wherein FIG. 14(a) is a sectional view of the sample of Comparative Example 3, and FIG. 14(b) is a sectional view of the sample of Example 6.

BEST MODE FOR CARRYING OUT THE INVENTION

Figure 1A:
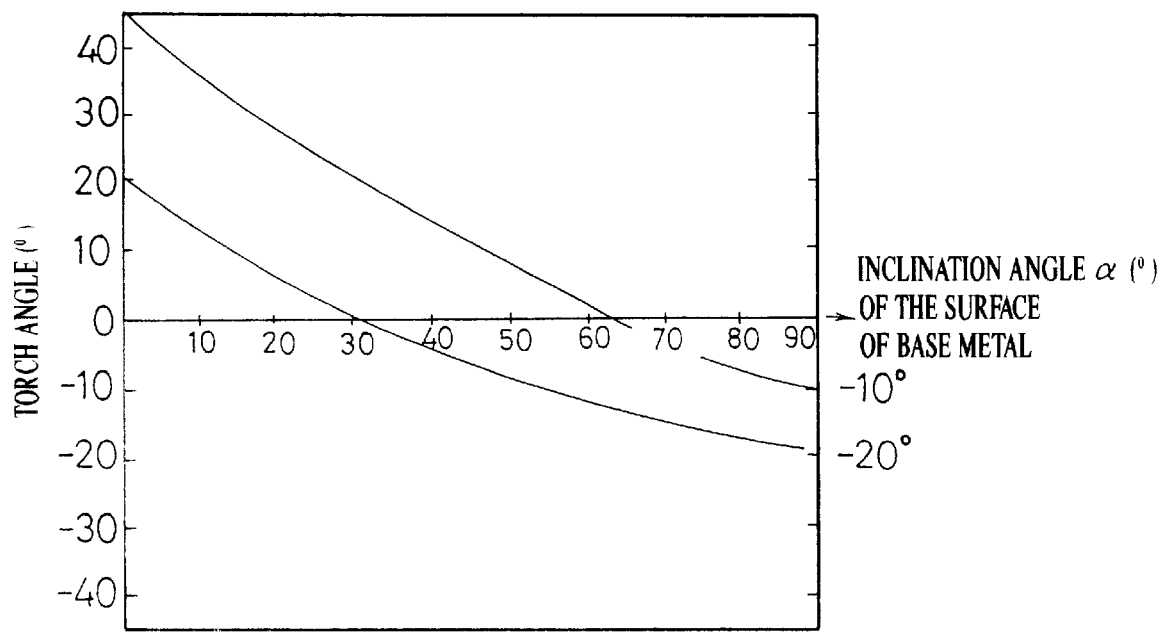
Figure 1B:
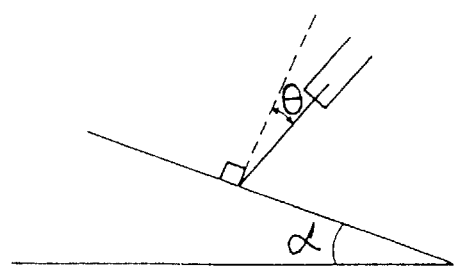
Figure 2A:
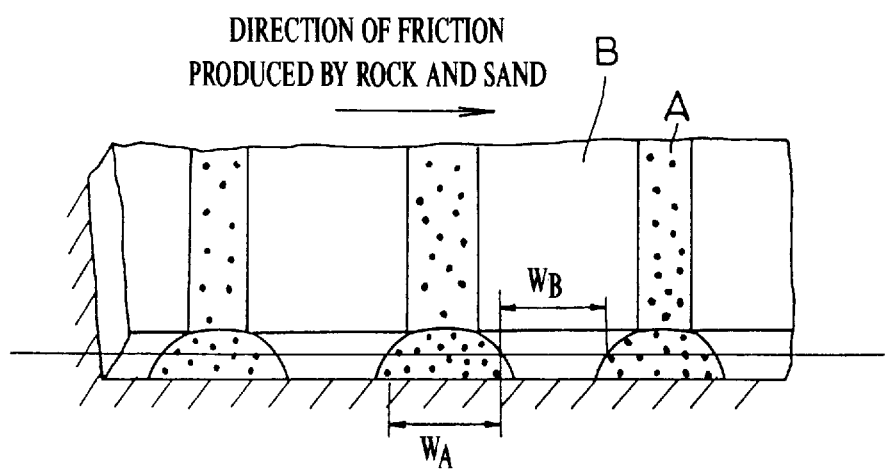
Figure 2B:
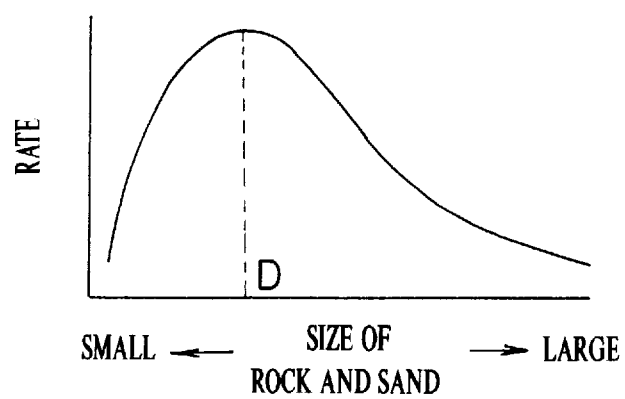
Figure 3A:
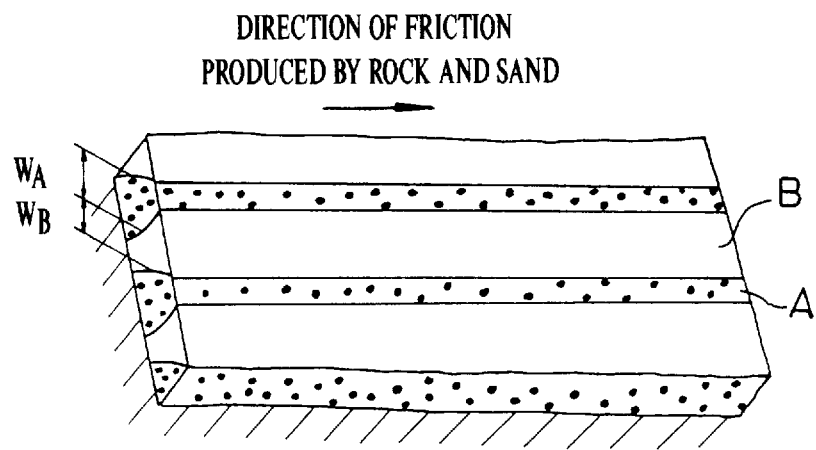
Figure 3B:
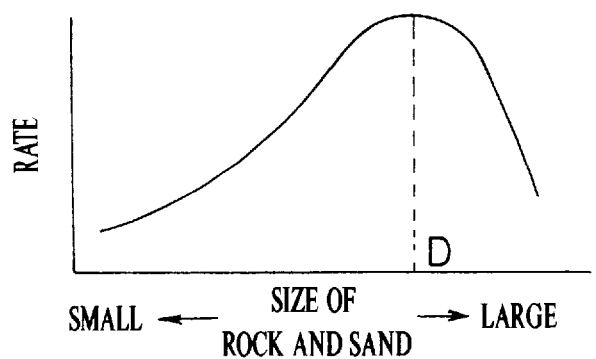

Referring now to the drawings, the wear-resistant overlay forming methods and wear-resistant composite members of the invention will be described according to preferred embodiments.

EXAMPLE 1

[overlaying method 1]

Figure 4:
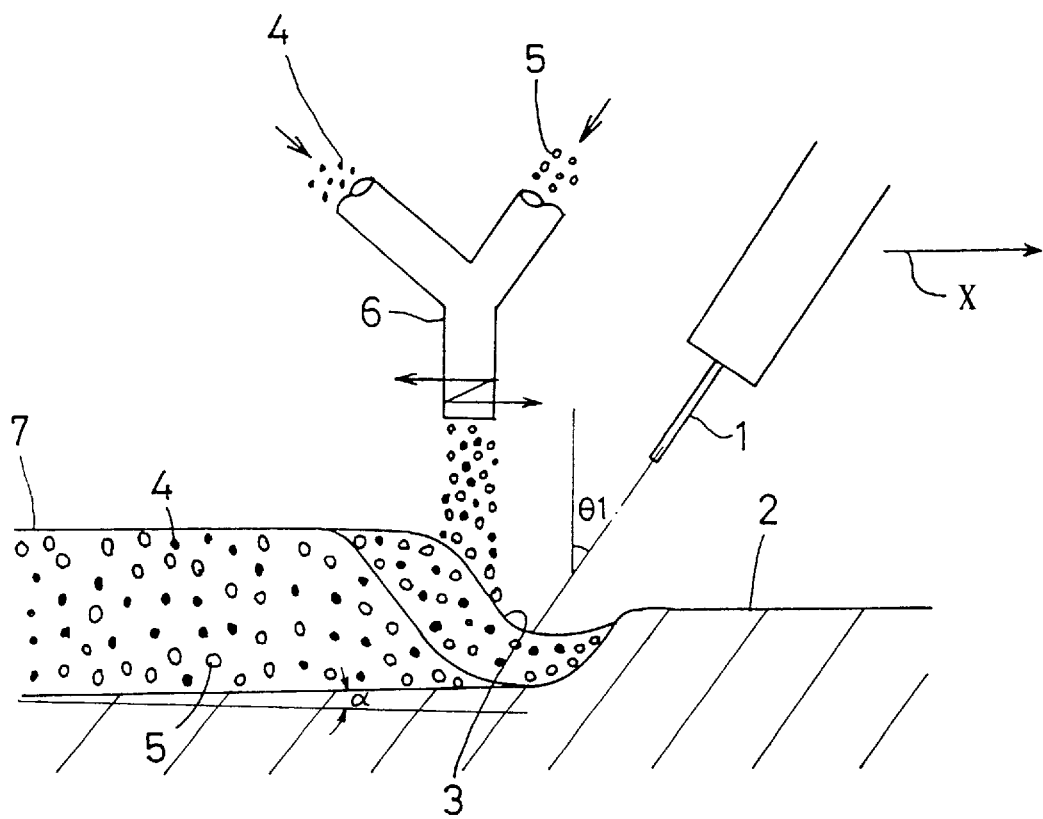

A wear-resistant overlay was formed by means of the overlay formation mechanism shown in FIG. 4. In this mechanism, an arc electrode 1 composed of a filler wire (KC-50 produced by Kawasaki Seitetsu and made from 50 kgs-class soft steel, $\phi$ 1.2 mm) was disposed so as to project by 25 mm and to incline at an angle $\theta 1$ (torch angle=30°) relative to a direction perpendicular to a base material 2 that was made from soft steel SS400 and disposed horizontally. Welding current flowing from the arc electrode 1 was 280 A, welding voltage was 28 V, and the feeding speed of the filler wire was 100 g/min. As a shield gas, carbon dioxide was fed along the arc electrode 1 to a work area at a speed of 30 liter/min. Hard particles 4 and second particles 5 were fed, with the aid of a forked nozzle 6, to a molten weld pool 3 formed by arc generated from the arc electrode 1. The hard particles 4 were composed of WC-7% Co particles having a particle diameter of 1.2 mm (density 14.5 g/cm$^3$) while the second particles 5 were composed of steel balls having a particle diameter of 1.7 mm (density 7.8 g/cm$^3$). The forked nozzle 6 was weaved in a welding direction X by a chopping wave having a frequency of 1.5 Hz such that the amplitude of oscillation in the direction perpendicular to the drawing plane of FIG. 4 was 30 mm (weaving: 30 mm×1.5 Hz), while the hard particles 4 and the second particles 5 were supplied to the forked nozzle 6 at a speed of 172 g/min and a speed of 28 g/min, respectively (mixing volume ratio=1:0.3).

Under the conditions described above, welding was performed in the welding direction X (i.e., in the direction to the right in FIG. 4) at a speed of 22 cm per minute. The density of the molten metal of the molten weld pool 3 just before the hard particles 4 and the second particles 5 were fed had been in the range of 7.06 to 7.21 g/cm$^3$.

As can be seen from FIG. 4, the hard particles 4 and the second particles 5 were fed to the area located behind (at the left hand of) the position in the welding direction X, the position being where the extension of the arc electrode 1 intersected the plane of the surface of the base material 2. The molten metal of the molten weld pool 3 in the area supplied with these particles was about to be raised owing to the effects of the arc so that the molten metal in this area was to be solidified without precipitation of the hard particles 4. While the molten metal being raised, the hard particles 4 and the second particles 5 were mixed therewith, so that the hard particles 4 were uniformly dispersed within an overlay 7 to be obtained after solidification. In this way, the overlay 7 having desired wear resistance could be achieved.

EXAMPLE 2

[overlaying method 2]

Figure 5:
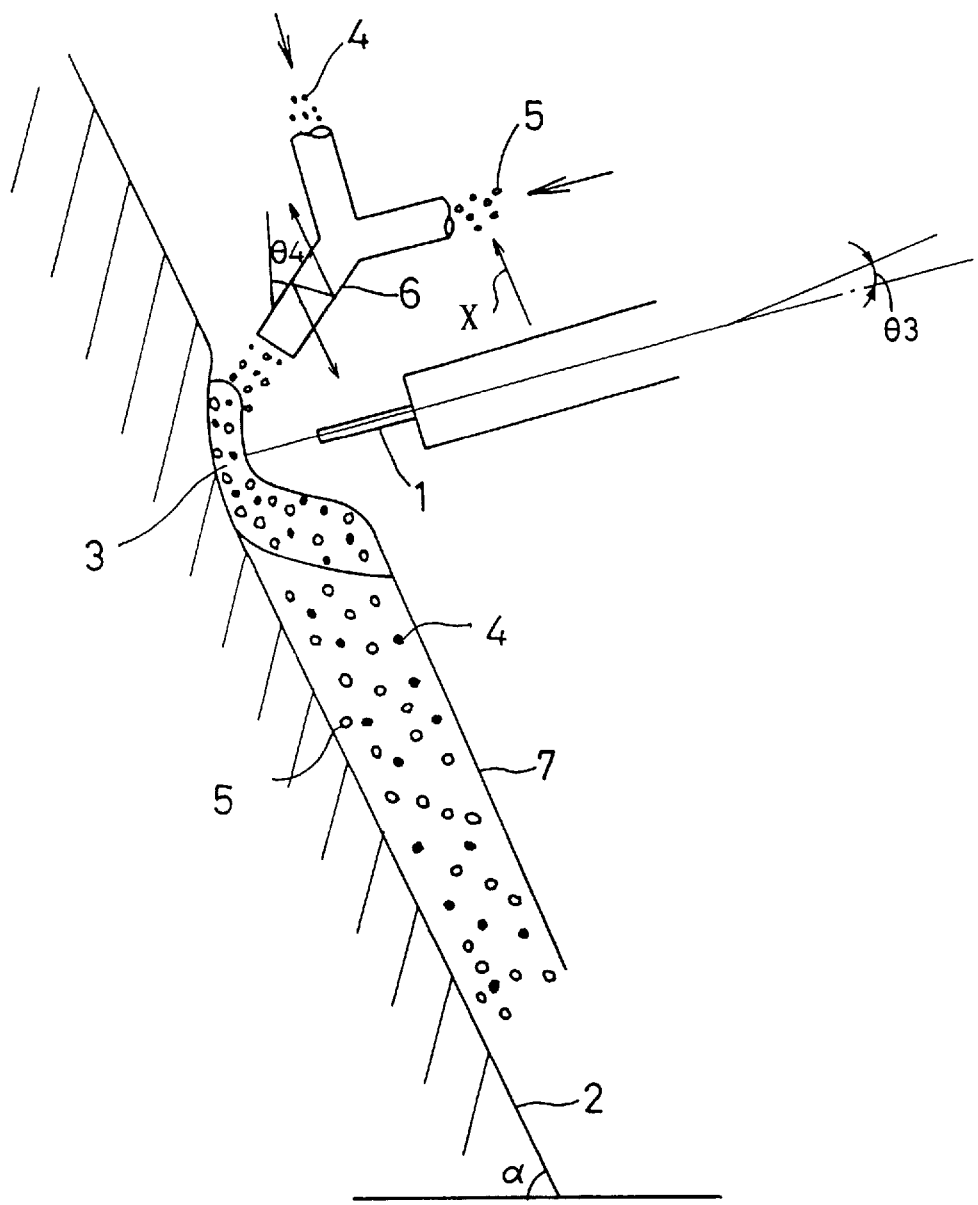

A wear-resistant overlay was formed by means of the overlay formation mechanism shown in FIG. 5, using the same arc electrode 1, base material 2, hard particles 4 and second particles 5 as those of Example 1. The welding conditions in this example were the same as in Example 1 except that welding current was 130 A, welding voltage was 23 V, and the feeding speed of carbon dioxide was 15 liter/min. The arc electrode 1 composed of a filler wire and projecting by 25 mm similarly to that of Example 1 was so disposed as to be at an angle $\theta 3$ (i.e., torch angle=$-10°$) with respect to the direction perpendicular to the base material 2 which was inclined at an angle $\theta 2$ (=65°) to a horizontal plane. The hard particles 4 and the second particles 5 were fed to the molten weld pool 3 at a speed of 38 g/min and a speed of 20 g/min, respectively (mixing volume ratio=1:1), by way of the forked nozzle 6 that was disposed with its outlet inclining at an angle $\theta 4$ (=15°) to a vertical plane.

Under the above conditions, arc welding was performed in the welding direction X (i.e., upward direction along the base material 2) at a speed of 6 cm per minute.

It will be seen from FIG. 5 that the hard particles 4 and the second particles 5 were fed to the area located ahead of (above) the position in the welding direction X, the position being where the extension of the arc electrode 1 intersected the plane of the surface of the base material 2. The molten metal of the molten weld pool 3 in the area supplied with these particles was about to flow down owing to gravity so that the molten metal in this area was solidified without precipitation of the hard particles 4. The hard particles 4 and the second particles 5 were mixed with the molten metal in this area while the molten metal flowing down. In this way, the overlay 7 having the hard particles 4 uniformly dispersed therein to ensure desired wear resistance could be obtained after solidification.

EXAMPLE 3

[overlaying method 3]

Figure 6:
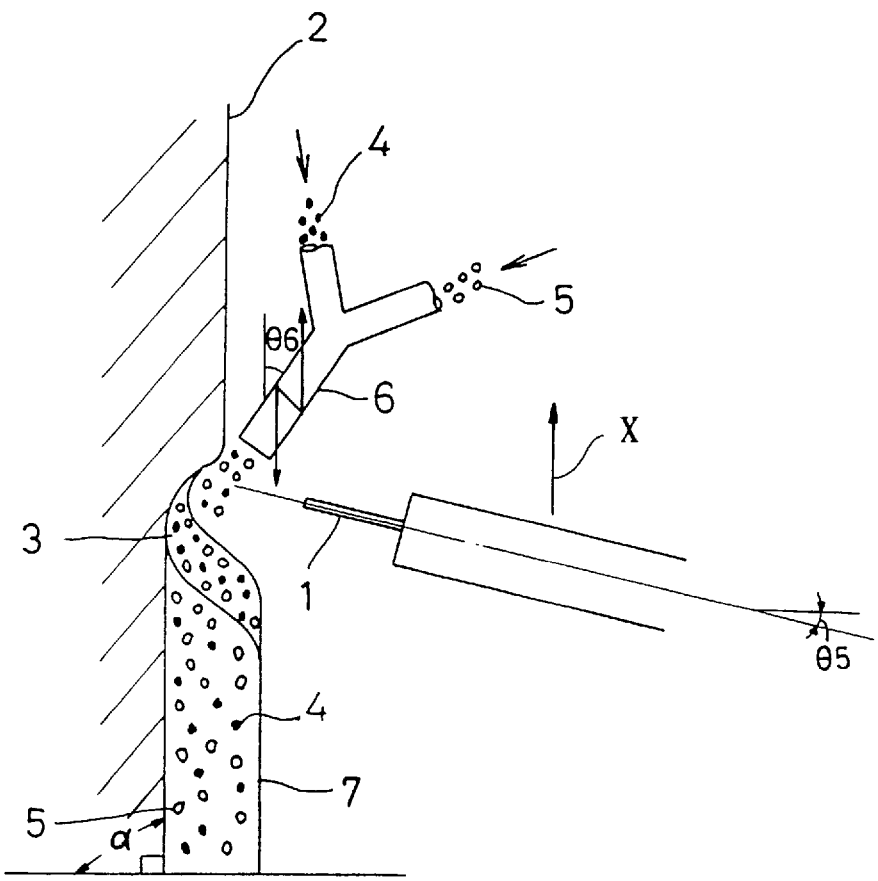

A wear-resistant overlay was formed by means of the overlay formation mechanism shown in FIG. 6, by the use of the same arc electrode 1, base material 2, hard particles 4 and second particles 5 as those of Example 2. The welding conditions of this example were the same as those of Example 2. In this mechanism, the base material 2 was disposed upright and the arc electrode 1 was inclined at an angle of $\theta 5$ (torch angle=$-15°$) to a direction perpendicular to the base material 2. The forked nozzle 6 was arranged with its outlet being at an angle $\theta 6$ (=25°) to a vertical plane. The hard particles 4 and the second particles 5 were fed to the forked nozzle at a speed of 38 g/min and a speed of 20 g/min, respectively (mixing volume ratio=1:1), and the mixture of these particles were then fed to the molten weld pool 3.

Under the above conditions, arc welding was performed in the welding direction X (i.e., upward direction along the upright base material 2) at a speed of 4 cm per minute.

It will be seen from FIG. 6 that the hard particles 4 and the second particles 5 were fed to the position where the extension of the arc electrode 1 intersected the plane of the surface of the base material 2. The molten metal in the area to which these particles were fed flowed down owing to gravity while solidification being underway so that the hard particles 4 did not precipitate within the molten weld pool 3 and the hard particles 4 and the second particles 5 were mixed with the molten metal flowing down. In this way, the hard particles 4 were uniformly dispersed in the resultant overlay 7.

(Comparative Example 1–Example 4)

Comparative Example 1

Figure 7A:
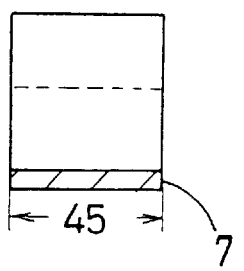
FIG. 7(a) is a front view and FIG. 7(b) a side view, each showing overlay samples prepared in Comparative Example 1 and Example 4 for checking their wear resistance.
Figure 7B:
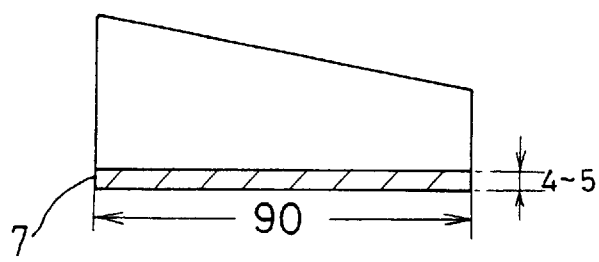

On a soft steel block, an overlay was formed under the following welding conditions to prepare a sample A as shown in FIGS. 7(a) and 7(b). As shown in the front view of FIG. 7(a) and the side view of FIG. 7(b), there was formed, on the sample A, the overlay 7 having a dimension of 45×90×4 to 5 mm (width×length×thickness).

(Sample A)
- welding current: 280 A
- welding voltage: 32 V
- welding speed: 20 cm/min
- weaving: 30 mm×1.5 Hz
- length of projection: 25 mm
- $CO_2$ gas: 30 liter/min
- torch angle: 5° (sweep-back angle)
- particle feeding position: directly under the arc
- hard particles: WC-7% Co
- particle diameter=1.2 mm
- filler wire: soft steel, $\phi$ 1.2 mm
- feeding amount of hard particles: 172 g/min In the sample A, the hard particles were deposited at the bottom of the overlay and a quite large amount of these hard particles deteriorated under the influence of heat.

EXAMPLE 4

Similarly to Comparative Example 1, overlaying was carried out under the following welding conditions to prepare a sample B.

(Sample B)
- welding current: 280 A
- welding voltage: 28 V
- welding speed: 22 cm/min
- weaving: 30 mm×1.5 Hz
- length of projection: 25 mm
- $CO_2$ gas: 30 liter/min
- torch angle: 30° (sweep-back angle)
- particle feeding position: behind the arc
- hard particles: WC-7% Co
- particle diameter=1.2 mm
- filler wire: soft steel, $\phi$ 1.2 mm
- feeding amount of hard particles: 172 g/min
- second particles (steel balls):
  - particle diameter=1.7 mm
  - feeding amount=28 g/min In this example, since the hard particles were charged behind the arc and the second particles were also charged, the hard particles were uniformly dispersed in the overlay of the sample B. The hard particles deteriorated in small amounts, being affected by heat.

Bench Abrasion Test

Figure 8:
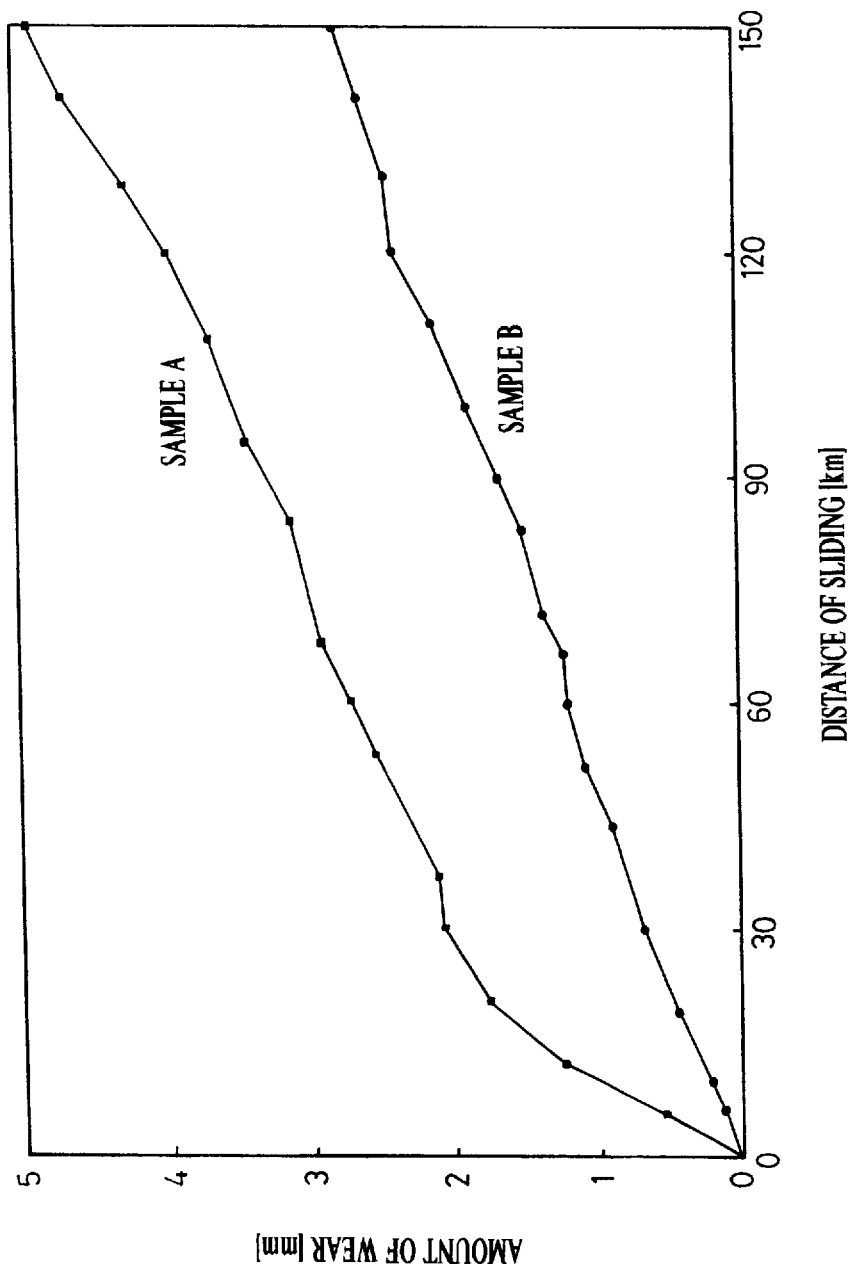
FIG. 8 is a graph showing the relationship between the sliding distance and wear amount of the samples of Comparative Example 1 and Example 4.

Silica sand containing a sufficient quantity of moisture was laid on concrete having a high compressive strength. This silica sand was used as a simulated rock-bed. The samples A and B were pressed against the simulated rock-bed with a pressure of 0.19 MPa and were moved so as to slide at a speed of 14.5 to 32 m/min. The amount of wear (i.e., the decrease in thickness (mm)) was measured over a specified sliding distance. FIG. 8 shows the relationship between the sliding distance and the amount of wear. It is to be understood from FIG. 8 that the overlay (sample B) prepared by the overlay forming method of the invention had uniformly dispersed hard particles most of which did not deteriorate. That is, the overlay forming method of the invention ensures formation of an overlay excellent in wear resistance.

(Comparative Example 2–Example 5)

Comparative Example 2

Figure 9A:
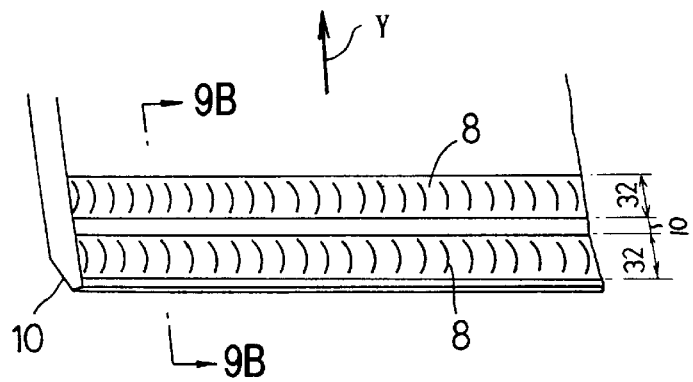
FIG. 9(a) is a perspective view and FIG. 9(b) a sectional view taken in the direction of the arrows of FIG. 9(a), each showing the tip of a cutting edge for wheeled loaders on which hard-facing deposit layers prepared in Comparative Example 2 are formed.
Figure 9B:
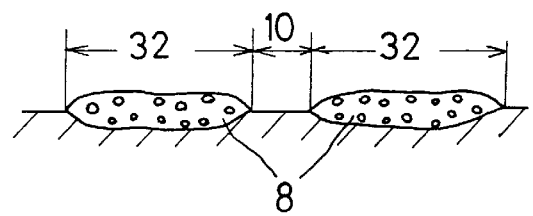

With the overlaying method of Example 1, an overlay was formed on a cutting edge for wheeled loaders under the following welding conditions to form a sample A on the tip of the cutting edge. In this sample A, two hard-facing deposit layers 8 (width=32 mm, deposit height=4 to 5 mm) were aligned with a space of 10 mm as shown in FIGS. 9(*a*) and 9(*b*), running in the direction transverse to the direction Y of friction produced by rock and sand (i.e., the direction Y in which rock and sand flow). FIG. 9(*b*) is a sectional view taken in the direction of the arrows of FIG. 9(*a*).

(Sample A)
- welding current: 260 A
- welding voltage: 28 V
- welding speed: 20 cm/min
- weaving: 30 mm×1.5 Hz
- length of projection: 25 mm
- $CO_2$ gas: 30 liter/min
- torch angle: 30° (sweep-back angle)
- particle feeding position: behind the arc
- hard particles: WC-8% Co
- particle diameter=1.2 mm
- filler wire: soft steel, φ 1.2 mm
- feeding amount of hard particles: 185 g/min
- second particles (steel balls):
    - particle diameter=1.7 mm
    - feeding amount=35 g/min

EXAMPLE 5

[alternate overlay A (average size of rock and sand D<15 cm)]

Figure 10A:
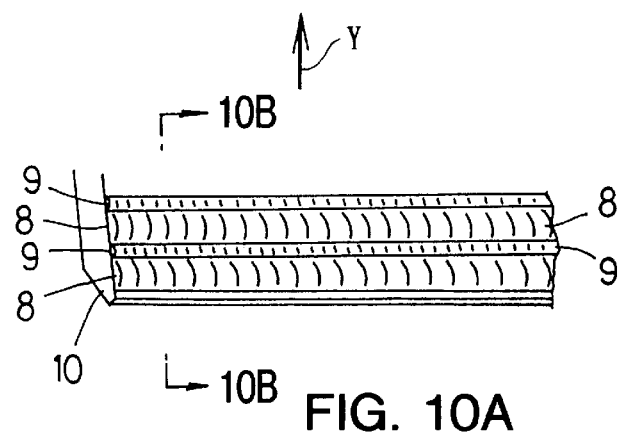
FIG. 10(a) is a perspective view and FIG. 10(b) a sectional view taken in the direction of the arrows of FIG. 10(a), each showing the tip of a cutting edge for wheeled loaders on which hard-facing deposit layers and soft-facing deposit layers prepared in Example 5 are alternately overlaid.
Figure 10B:
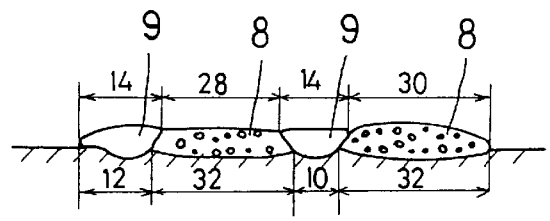

After formation of two hard-facing deposit layers 8 similarly to the sample A of Comparative Example 2, two soft-facing deposit layers 9 were formed under the following welding conditions such that the hard-facing deposit layer 8 located further from the edge than the other was held between the two soft-facing deposit layers 9 as shown in FIGS. 10(*a*) and 10(*b*) and such that the deposit height was 4 to 5 mm (Sample B). After the hard-facing deposit layer 8 held between the two soft-facing deposit layers 9 was formed so as to have a width of 32 mm, the upper width of it narrowed down to 28 mm under the influence of the soft-facing deposit layers 9 so that the hard-facing deposit layer 8 became substantially trapezoidal in cross-section as shown in FIG. 10(*b*) that is a sectional view taken in the direction of the arrows of FIG. 10(*a*). The cross section of the soft-facing deposit layers 9 was substantially in the form of a trapezoid whose upper side (=14 mm) was wider than the lower side.

(Sample B)
- welding current: 300 A
- welding voltage: 33 V
- welding speed: 25 cm/min
- weaving: 12 mm×2.5 Hz
- length of projection: 25 mm
- Ar gas: 25 liter/min
- torch angle: 30° (sweep-back angle)
- filler wire: DM 55M (produced by Nikko Yozai Kogyo Kabushiki Kaisha), φ 1.2 mm
    - Composition: C=0.05; Si=0.12; Mn=0.67; P=0.003; S=0.001; Ni=56.91; Fe=trace Abrasion Test The samples A and B thus prepared and a cutting edge having no overlays were respectively mounted on the buckets of wheeled loaders, and loading of sand and gravel was carried out with the respective buckets to evaluate these cutting edges as to their wear resistance and as to whether or not chips were created in their hard-facing deposit layers. Two types of sand and gravel, that is, non-crashed rough stone (size=10 to 15 cm) and a crashed sand product (size=1 mm or less) were used in this test. The ratio of operating time was approximately 1:1.

Figure 11:
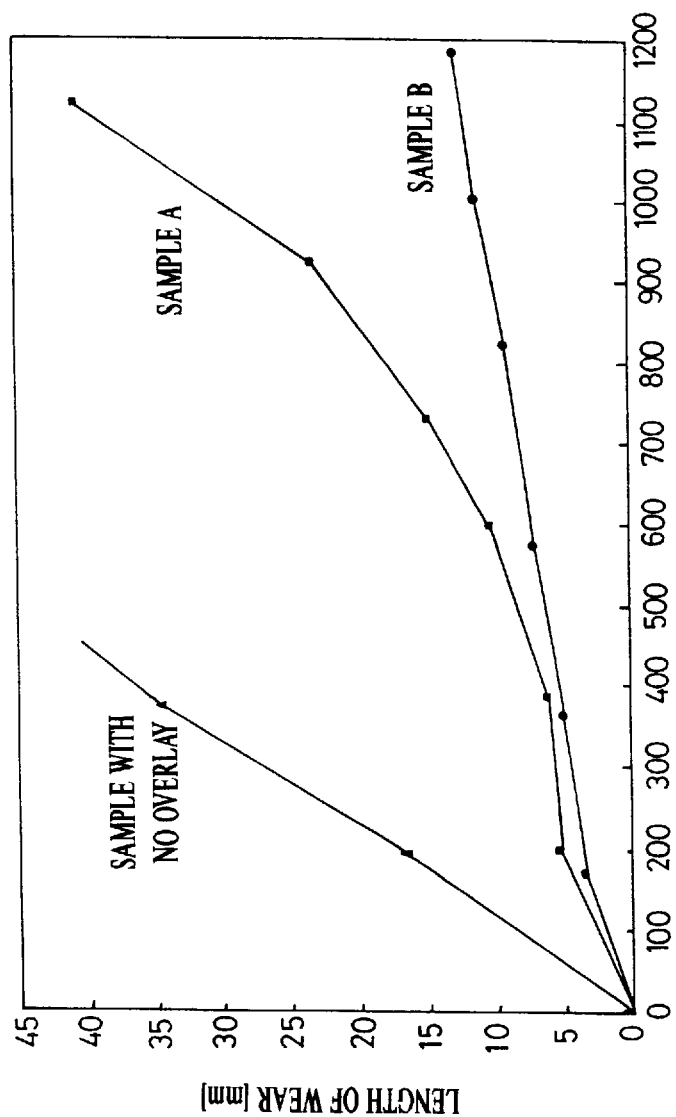
FIG. 11 is a graph showing the relationship between the operating time and length of wear of the samples of Comparative Example 2 and Example 5 and of a non-overlaid sample.

In the abrasion test, the thickness (mm) of wear in inclined areas 10 of the tips shown in FIGS. 9(*a*) and 10(*a*) was evaluated as wear length. The relationship between operating time (hour) for the wheeled loaders and wear length (mm) is shown in the graph of FIG. 11. It can be understood from FIG. 11 that the wear resistance of the sample B in which "the alternate overlay A" according to the invention is formed has superior wear resistance.

In this test, the hard-facing deposit layers 8 of the sample A were partially chipped during loading of non-crashed rough stone. Therefore, the hard-facing deposit layers 8 were consumed in the early stages (operating time=about 700 hours), and thereafter, the speed of wear in the cutting edge increased. On the other hand, such chips were not virtually seen in the sample B so that the speed of wear in the cutting edge of the sample B could be maintained low for a long time.

Comparative Example 3

By the use of a bucket tooth for hydraulic shovels, overlaying was performed with the overlaying method of Example 1 under the following welding conditions to form a sample A. As shown in FIG. 12(*a*), the sample A has four hard-facing deposit layers 8 (width=15 mm, deposit height=4 to 5 mm) which are formed on a bucket tooth for hydraulic shovels at intervals of 5 mm so as to run in parallel with the direction Y of friction produced by rock and sand (the direction Y in which rock and sand flow).

(Sample A)
- welding current: 260 A
- welding voltage: 32 V
- welding speed: 50 cm/min
- weaving: 12 mm×2.8 Hz
- length of projection: 25 mm
- $CO_2$ gas: 30 liter/min
- torch angle: 30° (sweep-back angle)
- particle feeding position: behind the arc
- hard particles: WC-7% Co
- particle diameter=1.2 mm
- filler wire: soft steel, φ 1.2 mm
- feeding amount of hard particles: 280 g/min

EXAMPLE 6

[alternate overlay B, hard particle dissolving over-lay]

After forming four hard-facing deposit layers 8 similarly to the sample A of Comparative Example 3, the soft-facing deposit layers 9 were formed between the hard-facing deposit layers 8 as shown in FIG. 12(*b*) under the following welding conditions so that a sample B having a deposit height of 4 to 5 mm was prepared. Each of the hard-facing deposit layers 8 was first overlaid so as to have a width of 15 mm at a lower side and then became substantially trapezoidal in cross-section, being dissolved by overlaying of the soft-facing deposit layers 9 so that the width of the lower side was reduced to 13 mm and the width of the upper side was reduced to 8 mm as shown in FIG. 12(c). FIG. 12(c) is a sectional view taken in the direction of the arrows of FIG. 12(b). Each cross-section of the soft-facing deposit layers 9 took the form of an upwardly-widened trapezoid having a width of 14 mm at the upper side and a width of 7 mm at the lower side.

(Sample B)
welding current: 260 A
welding voltage: 32 V
welding speed: 35 cm/min
weaving: 8 mm×2.8 Hz
length of projection: 25 mm
Ar gas: 30 liter/min
torch angle: 30° (sweep-back angle)
filler wire: soft steel, $\phi$ 1.2 mm In the preparation of the sample B, the hard particles contained in the hard-facing deposit layers 8 dissolved into the soft-facing deposit layers 9 during the formation of the soft-facing deposit layers 9 so that the hardness of the soft-facing deposit layers 9 was slightly improved. Note that the degree of this improvement is dependent on the extent to which the hard particles of the hard-facing deposit layers 8 dissolve into the soft-facing deposit layers 9.

Abrasion Test

The samples A and B thus prepared and a bucket tooth having no overlays were respectively mounted on buckets for hydraulic shovels, and operation for loading sand and gravel was carried out with the respective buckets to evaluate these bucket teeth as to their wear resistance and as to whether or not chips were created in their hard-facing deposit layers. The sand and gravel used herein contained 50 wt % sand (size=approximately 1 mm), 40 wt % gravel (size=1 mm to 10 cm), and 10 wt % cobble stone (size=10 to 30 cm).

Figure 12A:
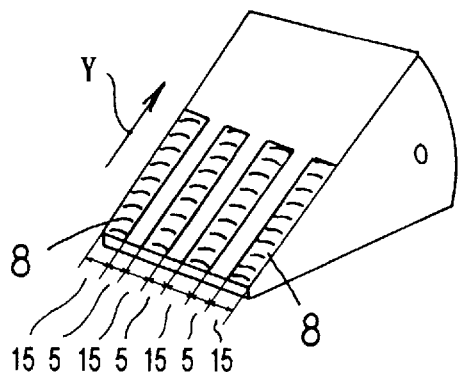
Figure 12B:
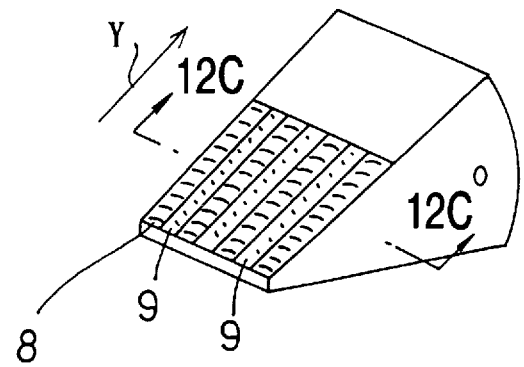
Figure 12C:
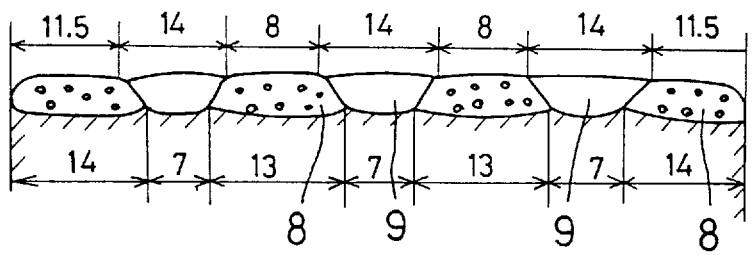
Figure 12D:
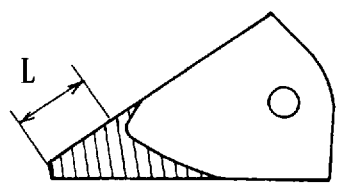
Figure 13:
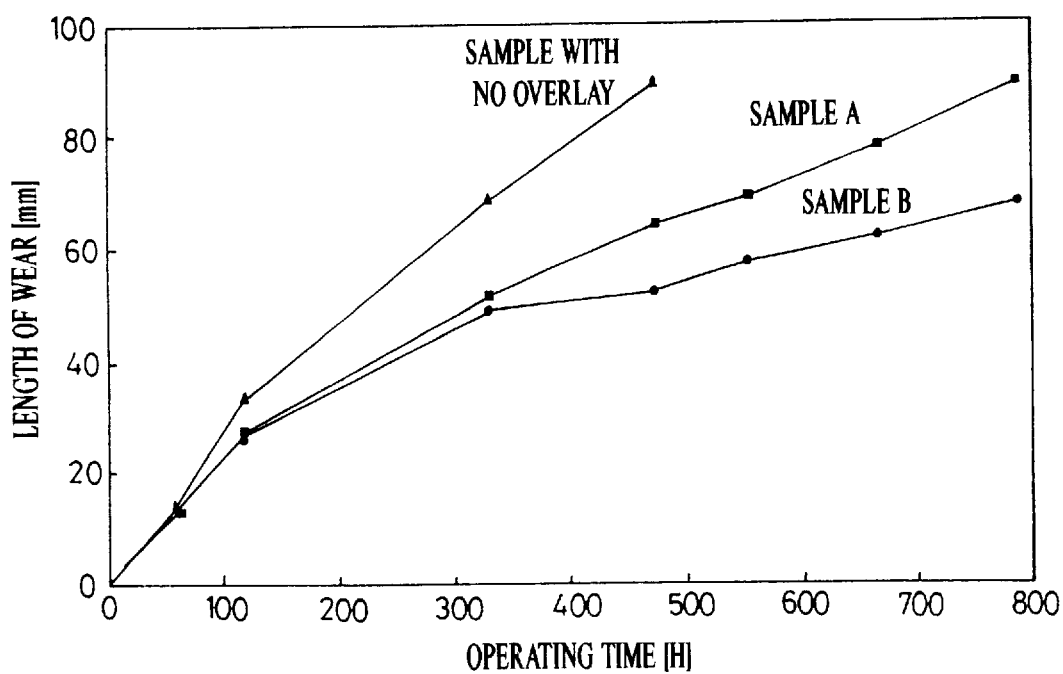
FIG. 13 is a graph showing the relationship between the operating time and length of wear of the samples of Comparative Example 3 and Example 6 and of a non-overlaid sample.

In the abrasion test, the length L (mm) of wear in the tip shown in FIG. 12(d) was evaluated as wear length. The relationship between operating time (hour) for the hydraulic shovels and wear length (mm) is shown in the graph of FIG. 13. It is understood from FIG. 13 that the wear resistance of the sample B in which "the alternate overlay B, hard particle dissolving overlay" according to the invention is formed has superior wear resistance.

Figure 14A:
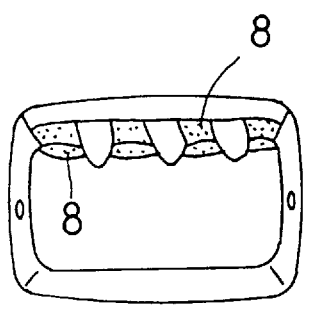
Figure 14B:
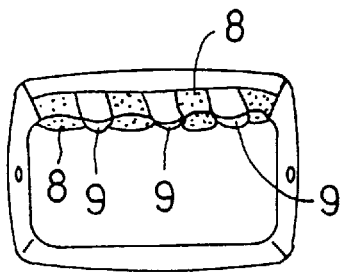

FIGS. 14(a) and 14(b) correspond to the sectional view of FIG. 12(b) taken in the direction of the arrow thereof, and show the cross-sections of the samples A and B after testing respectively. The sample A having no soft-facing deposit layers was worn deeply at parts between the hard-facing deposit layers 8 formed on the base material, i.e., bucket tooth (see FIG. 14(a)). The sample B in which "the alternate overlay B, hard particle dissolving over-lay" of the invention was formed did not show much wear not only in the hard-facing deposit layers 8 but also in the soft-facing deposit layers 9, compared to soft steel (see FIG. 14(b)). The reason for this is that when overlaying the soft-facing deposit layers 9, the hard particles of the hard-facing deposit layers 8 dissolved into the soft-facing deposit layers 9 so that the soft-facing deposit layers 9 increased in hardness.

In fact, the hardness of the soft-facing deposit layers 9 into which the hard particles had dissolved was measured and found to be 273 Hv. This is higher than the hardness (=165 Hv) of the overlay formed from only the filler wire.

In this test, the hard-facing deposit layers 8 of the sample A ware partially chipped while there were few chips created in the sample B. This means that the hardness of the soft-facing deposit layers 9 was increased by the dissolution/penetration of the hard particles while the function to reduce the impact imposed on the hard-facing deposit layers 8 and to hold the layers 8 was still maintained.

EXAMPLE 7

[alternate overlay B (average size of rock and sand D≦15 cm)]

To check the effects of the alternate overlay B, the following test was conducted using a ripper point for bulldozers.

(Sample Preparation)

Figure 15A:
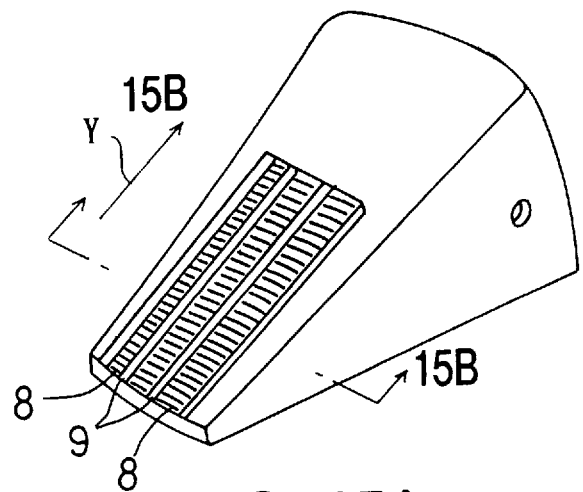
FIGS. 15(a) to 15(c) are a perspective view, sectional view taken in the direction of the arrows of FIG. 5(a), wear diagram, respectively, of a ripper point for bulldozers on which hard-facing deposit layers and soft-facing deposit layers prepared in Example 7 are alternately overlaid.
Figure 15B:
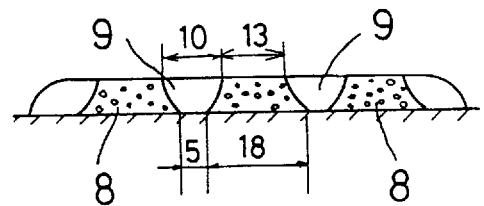

Overlaying was performed with the overlaying method of Example 1 under the following welding conditions to prepare a sample in which three hard-facing deposit layers 8 (width=18 mm, deposit height=4 to 5 mm) were formed on a ripper point for bulldozers at intervals of 5 mm as shown in FIG. 15(a), these deposit layers 8 being parallel with the direction Y of friction produced by rock and sand (i.e., the direction Y in which rock and sand flow).

welding current: 260 A
welding voltage: 32 V
welding speed: 45 cm/min
weaving: 15 mm×2.8 Hz
length of projection: 25 mm
$CO_2$ gas: 30 liter/min
torch angle: 30° (sweep-back angle)
particle feeding position: behind the arc
hard particles: WC-7% Co
particle diameter=1.2 mm
filler wire: soft steel, $\phi$ 1.2 mm
feeding amount of hard particles: 280 g/min
second particles (steel balls):
  particle diameter=1.7 mm
  feeding amount=15 g/min Then, soft-facing deposit layers 9 were overlaid between the above hard-facing deposit layers 8 thus formed under the following welding conditions so as to have a deposit height of 4 to 5 mm. Each of the hard-facing deposit layers 8 of this sample was over-laid so as to have a width of 18 mm and, after that, became substantially trapezoidal in cross-section as shown in FIG. 15(b), with the upper side being reduced to 13 mm in width owing to overlaying of the soft-facing deposit layers 9. FIG. 15(b) is a sectional view taken in the direction of the arrows in FIG. 15(a). The cross-section of each soft-facing deposit layer 9 is an upwardly-widened trapezoid having a width of 10 mm at the upper side and a width of 5 mm at the lower side.

welding current: 230 A
welding voltage: 30 V
welding speed: 50 cm/min
length of projection: 25 mm
$CO_2$ gas: 30 liter/min
torch angle: 30° (sweep-back angle)
filler wire: SUS 316L (containing flux) $\phi$ 1.2 mm Method of Testing The samples thus prepared and a ripper point having no over-lays formed thereon were respectively mounted on bulldozers and operation for ripping a rock-base of chert which had not been blasted was carried out to evaluate these ripper points as to their wear resistance and as to whether or not chips were created in their hard-facing deposit layers. The size of rock to be ripped was 10 to 80 cm (about 40 cm on average).

Figure 15C:
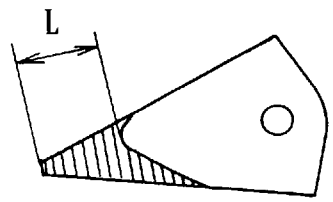
Figure 16:
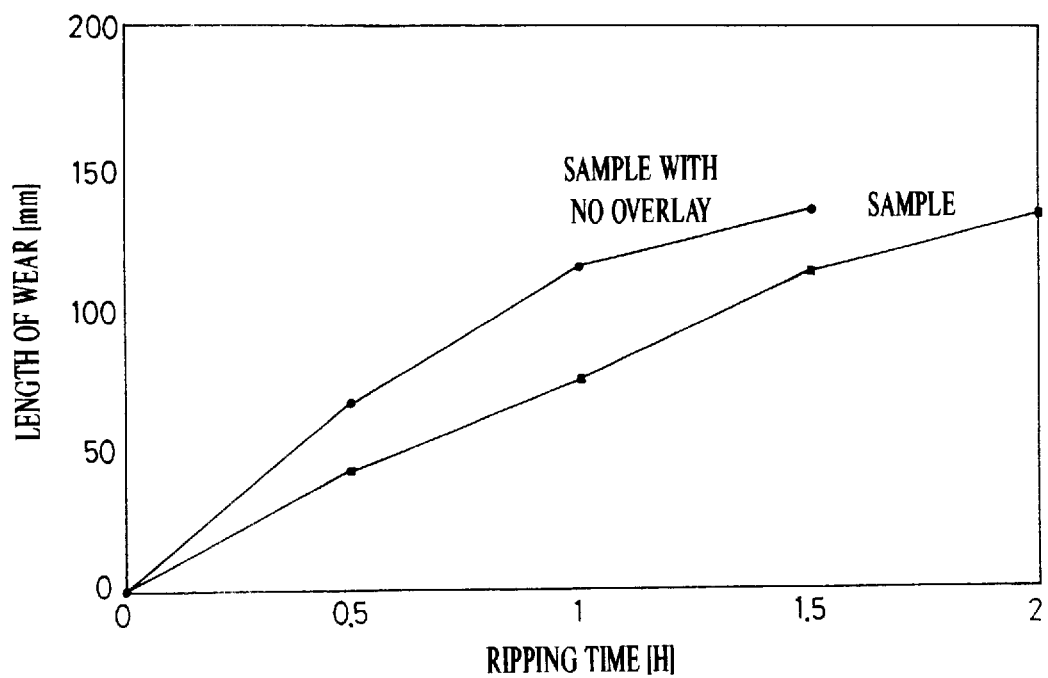
FIG. 16 is a graph showing the relationship between the ripping time and length of wear of the sample of Example 7 and of a non-overlaid sample.

In the abrasion test, the length L (mm) of wear in the tip shown in FIG. 15(c) was measured as wear length. The relationship between ripping time (hour) for the ripper points and wear length (mm) is shown in the graph of FIG. 16. It is understood from FIG. 16 that the wear resistance of the sample in which "the alternate overlay B" according to the invention is formed has superior wear resistance, and that particularly its initial wear speed is very low. This means that the sample can be kept, for a long time, in its original shape which ensures remarkable digging ability and therefore the invention achieves high efficiency in ripping operation.

In this test, there were created few chips in the hard-facing deposit layers 8 of the sample.

EXAMPLE 8

[stripe-shaped overlay]

Figure 17A:
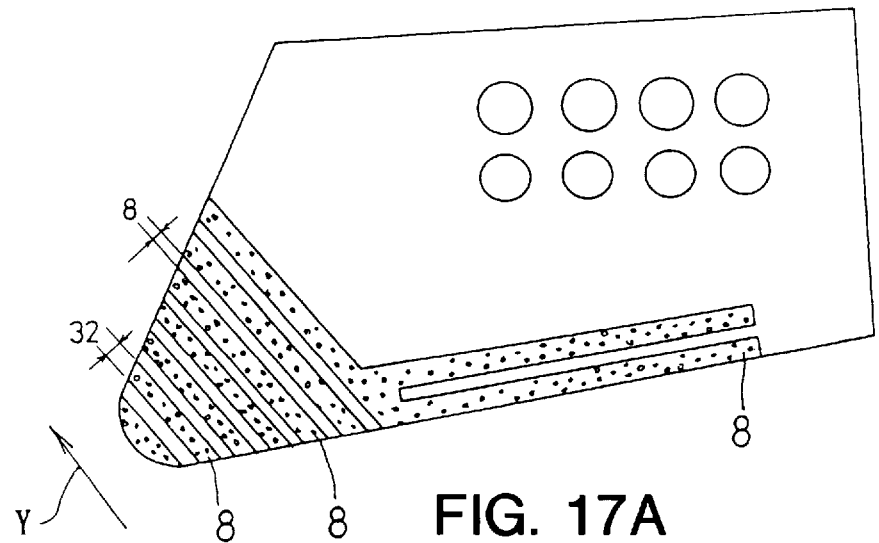
FIG. 17(a) is a side view of an end bit for bulldozers on which hard-facing deposit layers prepared in Example 8 are overlaid.
Figure 17B:
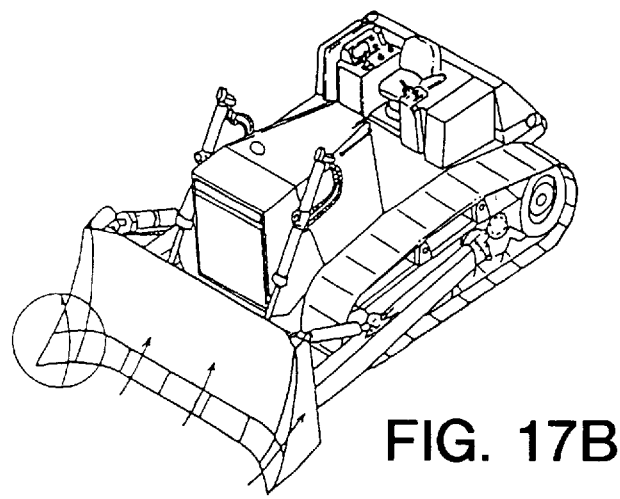
FIG. 17(b) is a layout diagram of the end bit attached to the bulldozer.

With the overlaying method of Example 1, overlaying was performed under the following welding conditions to form a sample in which hard-facing deposit layers 8 (width=32 mm, deposit height=4 to 5 mm) were formed at intervals of 8 mm on an end bit for bulldozers as shown in FIG. 17(a), the hard-facing deposit layers 8 running parallel with the direction Y of friction produced by rock and sand (i.e., the direction Y in which rock and sand flow). More precisely, seven hard-facing deposit layers 8 were formed on the corner and two layers 8 on the edge. Such an end bit as shown in FIG. 17(a) is known to be attached to the part of a bulldozer indicated by the circle in FIG. 17(b).

welding current: 280 A
welding voltage: 28 V
welding speed: 22 cm/min
weaving: 30 mm×1.5 Hz
length of projection: 25 mm
$CO_2$ gas: 30 liter/min
torch angle: 30° (sweep-back angle)
particle feeding position: behind the arc
hard particles: WC-7% Co
particle diameter=1.2 mm
filler wire: soft steel, φ 1.2 mm
feeding amount of hard particles: 172 g/min
second particles (steel balls):
　particle diameter=1.7 mm
　feeding amount=28 g/min Abrasion Test The sample thus prepared and an end bit having no overlays formed thereon were respectively attached to bulldozers, and ripping and dozing (earth removal) of rock and sand was repeatedly performed to evaluate the wear resistance of these end bits and check the presence/absence of chips in their hard-facing deposit layers. Note that the rock and sand used herein included various sizes ranging from powder-like, ground, hard sandstone to masses of rock of about 60 cm.

Figure 17C:
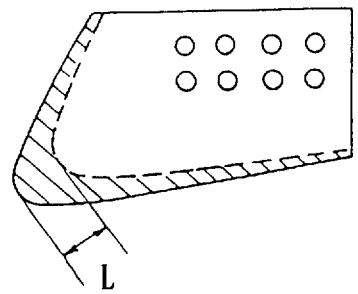
FIG. 17(c) is a wear diagram of the end bit.
Figure 18:
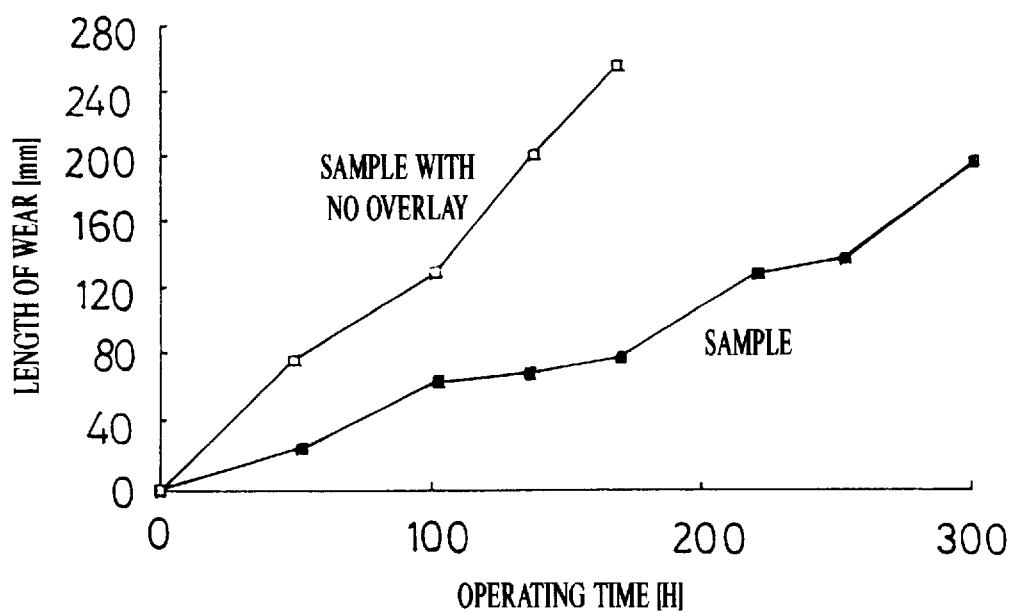
FIG. 18 is a graph showing the relationship between the operating time and length of wear of the sample of Example 8 and of a non-overlaid sample.

In this test, the length L (mm) between the corner of the end bit before the test and the corner of the end bit after the abrasion as shown in FIG. 17(c) was evaluated as wear length. Wear resistance can be evaluated from the relationship between operating time (hour) for the bulldozer and wear length (mm) shown in the graph of FIG. 18. It is understood from FIG. 18 that the wear resistance of the sample in which "the stripe-shaped overlay" according to the invention is formed has superior wear resistance.

There were found a few chips in the hard-facing deposit layers 8 of the sample. This is due to the facts that the hard-facing deposit layers 8 were formed in the shape of stripes, running in the direction Y of friction produced by rock and sand, and that slits were provided between the deposit layers 8 so as to run along the direction Y of friction.

Like Example 1, the densities of the hard particles, second particles and molten metal of Examples 2 to 8 were 14.5 $g/cm^3$, 7.8 $g/cm^3$ and 7.06 to 7.21 $g/cm^3$, respectively.

Figure 19:
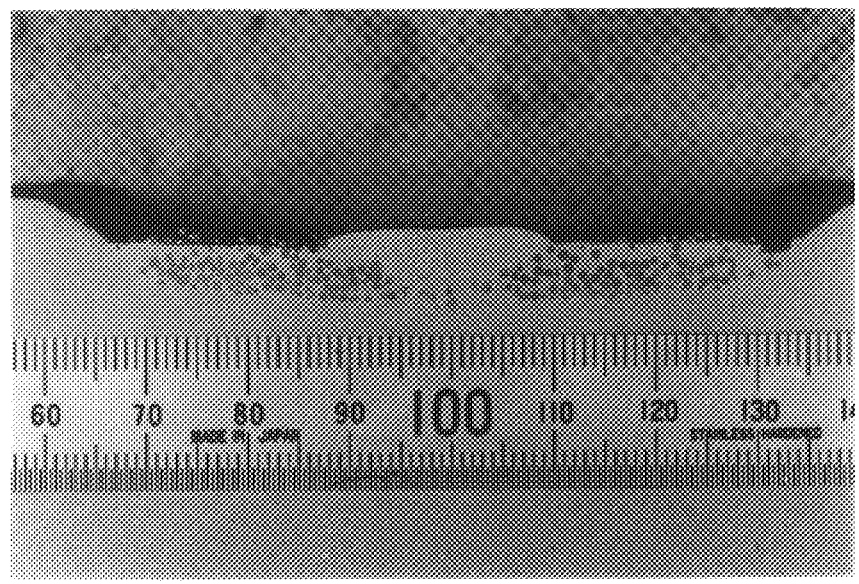
FIG. 19 is a metal photograph showing the cross-section of a wear-resistant overlay formed under the same conditions as one of Example 7 except that second particles are not added to this over-lay.
Figure 20:
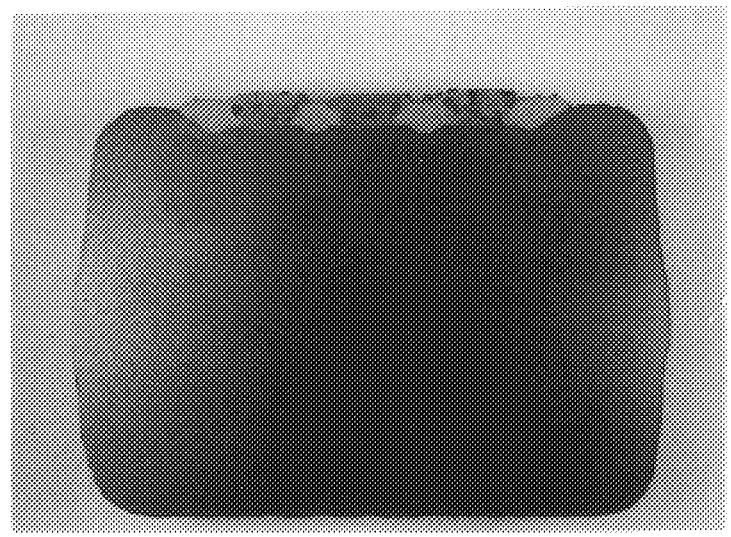
FIG. 20 is a metal photograph showing the cross-section of a wear-resistant overlay formed under the same conditions as one of Example 7 except that second particles are not added to this overlay and the material of the soft-facing deposit layers is replaced with a nickel alloy.

Although second particles were added to the wear-resistant overlays in the forgoing examples, addition of the second particles is not necessarily needed to achieve uniform dispersion of the hard particles. To form a wear-resistant overlay, hard-facing deposit layers 8 including the hard particles 4 and soft-facing deposit layers 9 were alternately overlaid on a ripper point for bulldozers under the same conditions as Example 7 except that the second particles were not added. FIG. 19 is a photograph showing the metallographic structure of the cross-section of this wear-resistant overlay. In this photo, the part which appears to be whitish is the soft-facing deposit layer 9, and the parts which contain dark particles (=hard particles 4) and exist on both sides of the whitish part are the hard-facing deposit layers 8. FIG. 20 is a photograph of the metallographic structure of the cross-section of a wear-resistant alternate overlay which is formed similarly expect that a nickel alloy is used as the material of the soft-facing deposit layers 9. In this photo of FIG. 20, the four whitish layers are the soft-facing deposit layers 9 and the three layers each located between the soft-facing deposit layers 9 are the hard-facing deposit layers 8 in which the hard particles 4 (these particles appear to be black) are dispersed. It can be understood from these photos that the hard particles 4 of both wear-resistant overlays are uniformly dispersed in their hard-facing deposit layers 8 without precipitating, and that in the former overlay shown in FIG. 19, a small amount of hard particles 4 is included in the soft-facing deposit layer 9.

EXAMPLE 9

(ripper point for bulldozers-1-)

Structure

Figure 21A:
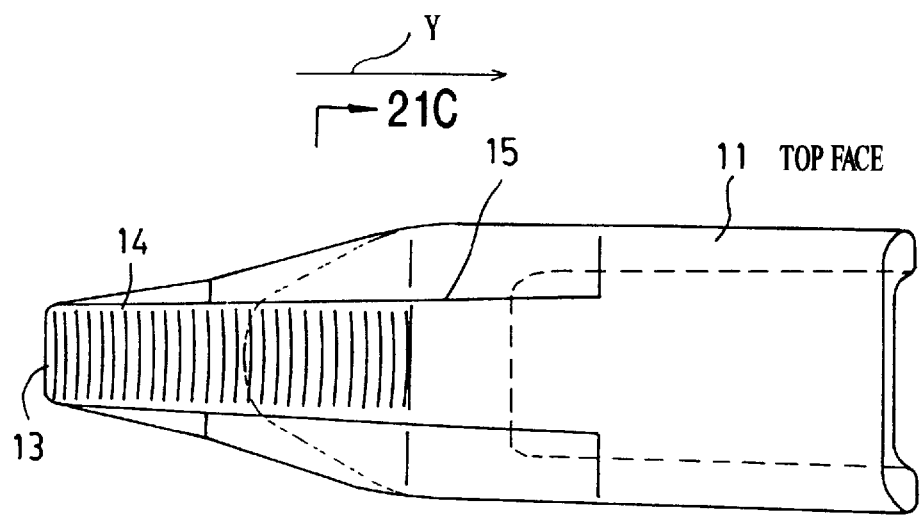
FIGS. 21(a) to 21(c) are a plan view, side view and sectional view taken in the direction of the arrows of FIG. 21(a), respectively, of a ripper point for bulldozers on which a wear-resistant overlay prepared in Example 9 is formed.
Figure 21B:
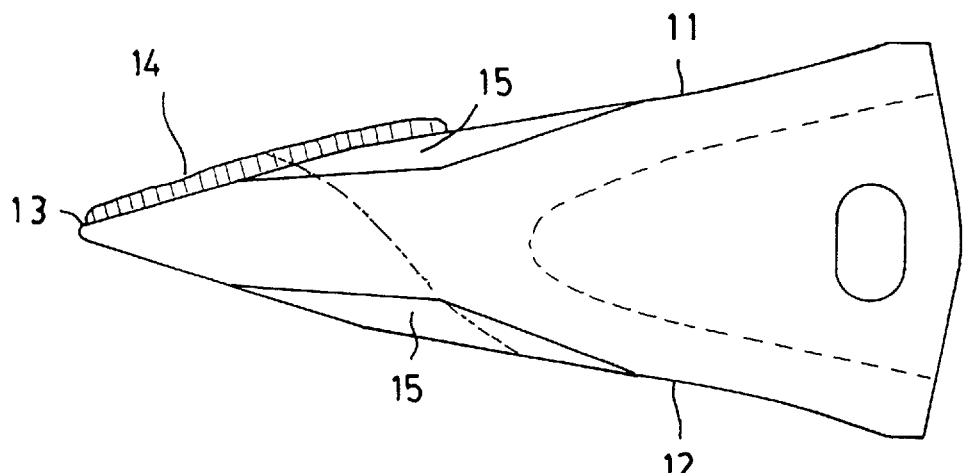
Figure 21C:
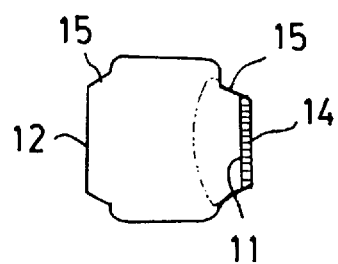

In a ripper point for bulldozers as shown in FIGS. 21(a) to 21(c) in which a top face 11 and a bottom face 12 meet each other at the tip to form a digging edge 13, a wear-resistant overlay 14 was formed with the following overlaying process so as to extend backward from the digging edge 13 on the top face 11. The area on the top face 11 covered with the wear-resistant overlay 14 and the area of the bottom face 12 corresponding thereto were more raised and thickened than the lateral sides so that a central protuberance 15 was formed. FIG. 21(a) is a plan view of the ripper point with the top face 11 being viewed from above, FIG. 21(b) is a side view and FIG. 21(c) is a sectional view taken in the direction of the arrows in FIG. 21(a). Note that the part of the ripper point 11 enclosed by the broken lines in the figures is hollow.

Overlaying process

Now there will be given an explanation on the process for forming the wear-resistant overlay 14 by the use of the overlay formation mechanism shown in FIG. 22. In this mechanism, an arc electrode 16, which was composed of a filler wire (made from soft steel, φ=1.2 mm) protruding by 25 mm, was inclined at an angle θ1 (torch angle=30°) with respect to a direction perpendicular to a base material 17 horizontally placed. The welding current of the arc electrode 16 was 280 A, and its welding voltage was 28 V. The feeding speed of the filler wire was 100 g/min, and carbon dioxide was fed along the arc electrode 16 to the work area as a shield gas at a speed of 30 liters per minute. Hard particles 19 composed of WC-7% Co particles having a particle diameter of 1.2 mm were fed through a nozzle 20 to a molten weld pool 18 that was formed by arc generated from the arc electrode 16. The nozzle 20 was weaved in the welding direction X by a chopping wave having a frequency of 1.5 Hz such that the amplitude of oscillation in the direction perpendicular to the drawing plane of FIG. 22 was 30 mm (weaving: 30 mm×1.5 Hz), while the hard particles 19 being supplied to the molten weld pool 18 at a speed of 200 g/min.

Under the above conditions, welding was proceeded in the welding direction X (to the right in FIG. 22) at a speed of 20 cm/min such that the wear-resistant overlay 14 was formed so as to have a thickness of 6 mm.

Evaluation

The ripper point thus prepared was used for ripping bauxite for 100 hours. The shape of wear in the ripper point after 100-hour operation is indicated by the two-dot-chain lines in FIGS. 21(*a*) to 21(*c*). As can be seen from these figures, after being subjected to abrasion, the tip of the ripper point was not rounded but kept sharp, having a conical shape that extended along the wear-resistant overlay 14 and was good enough to withstand continuous digging operation.

EXAMPLE 10
(ripper point for bulldozers–2–)

Structure

Figure 23A:
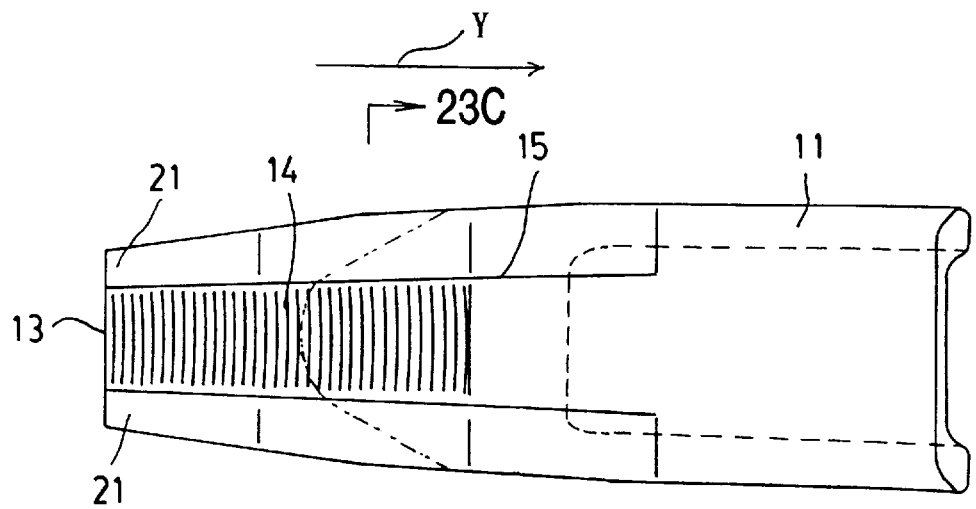
FIGS. 23(a) to 23(c) are a plan view, side view and sectional view taken in the direction of the arrows of FIG. 23(a), respectively, of a ripper point for bulldozers in which a wear-resistant overlay prepared in Example 10 is formed.
Figure 23B:
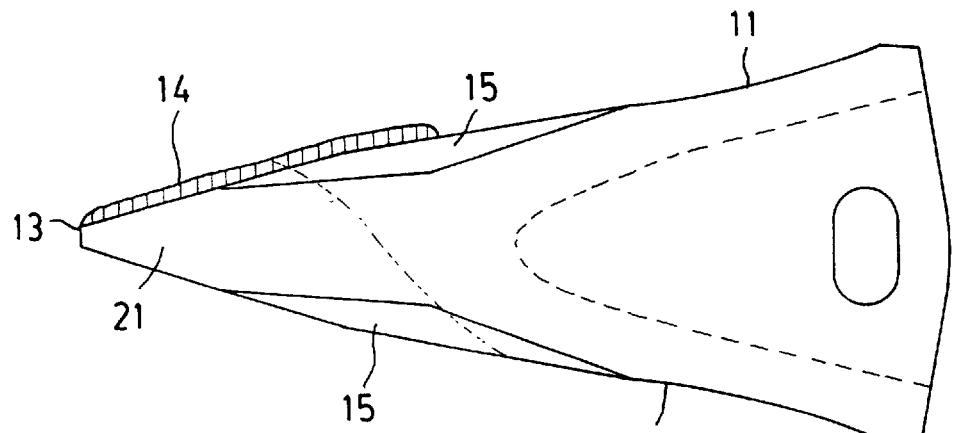
Figure 23C:
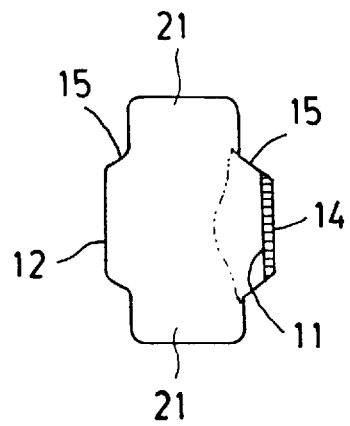

In a ripper point for bulldozers as shown in FIGS. 23(*a*) to 23(*c*) in which the top face 11 and the bottom face 12 meet each other at the tip to form the digging edge 13, the wear-resistant overlay 14 was formed with the same overlaying process as that of Example 9 so as to extend backward from the digging edge 13 on the top face 11. The wear-resistant overlay 14 was not formed on the peripheral part (projected part 21) but formed on the central protuberance 15 which was more raised than the peripheral part. The projected part 21 had lower wear resistance and less thickness than the part where the wear-resistant overlay 14 was formed, so that it would be worn out at early stages. FIG. 23(*a*) is a plan view of the ripper point with the top face 11 being viewed from above, FIG. 23(*b*) is a side view, and FIG. 23(*c*) is a sectional view taken in the direction of the arrows in FIG. 23(*a*). Note that the part of the ripper point enclosed by the broken lines in the figures is hollow.

Evaluation

The ripper point thus prepared was used for ripping bauxite for 100 hours. The shape of wear in the ripper point after 100-hour operation is indicated by the two-dot chain lines in FIGS. 23(*a*) to 23(*c*). As can be seen from these figures, after being subjected to abrasion, the tip of the ripper point was not rounded but kept sharp, having a conical shape that extended along the wear-resistant overlay 14 and was good enough to withstand continuous digging operation. If the projected area 21 had been also provided with the wear-resistant overlay 14, a ripper point which was not suited for digging of rocky soil including hard, big boulders but suited for use with soft sandy soil could have been obtained.

EXAMPLE 11
(ripper point for bulldozers-3-)

Structure

Figure 24A:
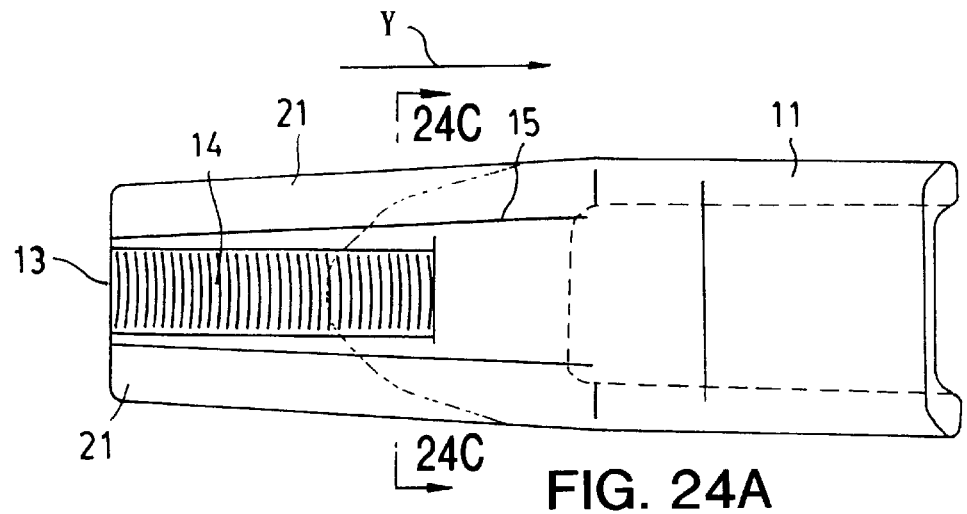
FIGS. 24(a) to 24(c) are a plan view, side view and sectional view taken in the direction of the arrows of FIG. 24(a), respectively, of a ripper point for bulldozers on which a wear-resistant overlay prepared in Example 11 is formed.
Figure 24B:
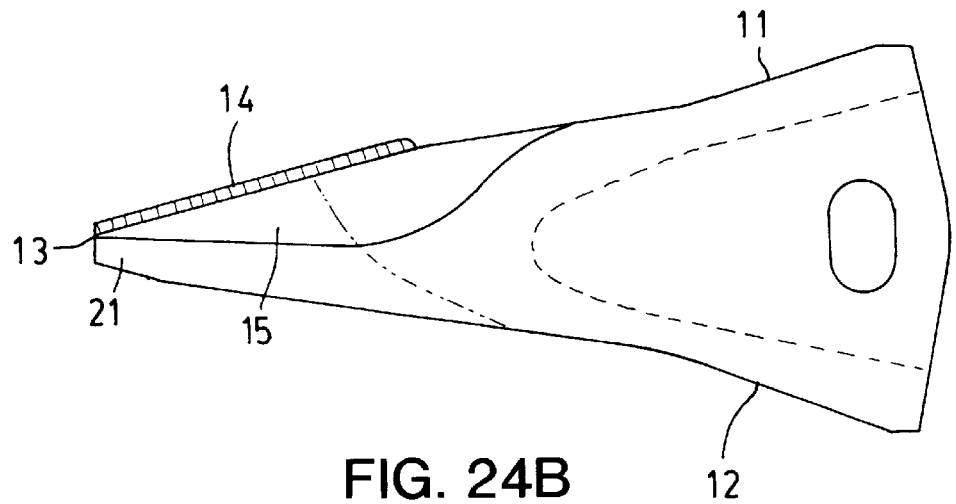
Figure 24C:
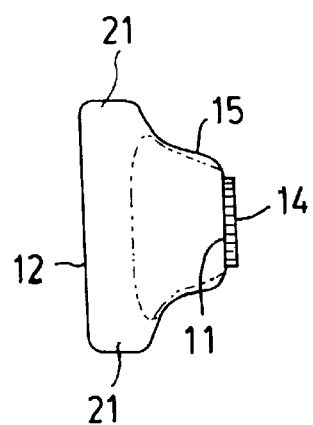

In a ripper point for bulldozers as shown in FIGS. 24(*a*) to 24(*c*) in which the top face 11 and the bottom face 12 meet each other at the tip to form the digging edge 13, the wear-resistant overlay 14 was formed with the same overlaying process as that of Example 9 so as to extend backward from the digging edge 13 on the top face 11. It should be noted that the ripper point of this example had the projected area 21 but did not have a protuberance on the bottom face 12, and that the wear-resistant overlay 14 was narrower in width than the central protuberance 15 formed on the top face 11. Since the ripper point of this example was thin and had no protuberance on the bottom face 12, it had high digging ability. FIG. 24(*a*) is a plan view of the ripper point with the top face 11 being viewed from above, FIG. 24(*b*) is a side view, and FIG. 24(*c*) is a sectional view taken in the direction of the arrows in FIG. 24(*a*). The part of the ripper point enclosed by the broken lines in the figures is hollow.

Evaluation

The ripper point thus prepared was used for ripping bauxite for 100 hours. The shape of wear in the ripper point after 100-hour operation is indicated by the two-dot-chain lines in FIGS. 24(*a*) to 23(*c*). As can be seen from these figures, after being subjected to abrasion, the tip of the ripper point was not rounded but kept sharp, having a conical shape that extends along the wear-resistant over-lay 14 and was good enough to withstand continuous digging operation.

EXAMPLE 12
(bucket tooth for hydraulic shovels-1-)

Structure

Figure 25A:
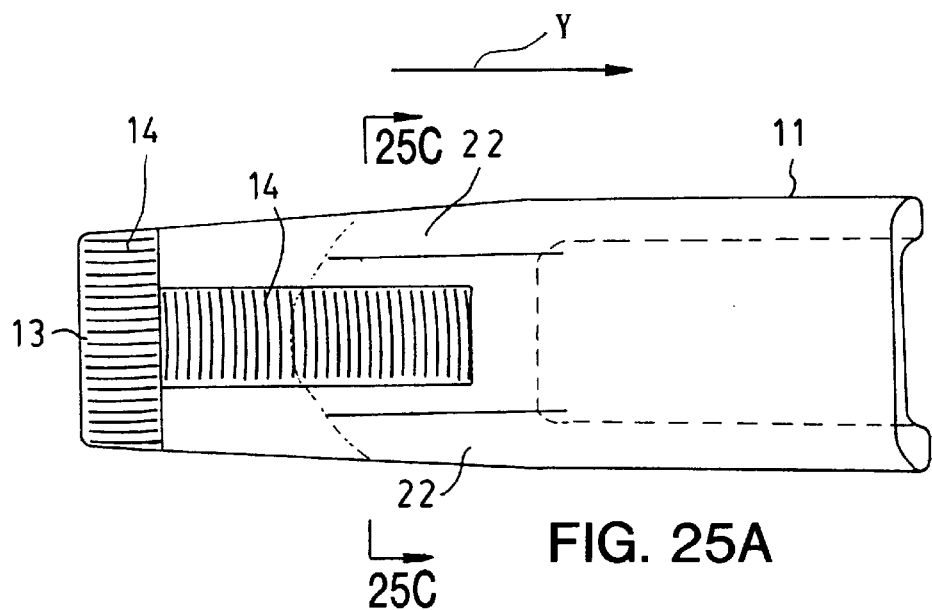
FIGS. 25(a) to 25(c) are a plan view, side view and sectional view taken in the direction of the arrows of FIG. 25(a), respectively, of a bucket tooth for hydraulic shovels on which a wear-resistant overlay prepared in Example 12 is formed.
Figure 25B:
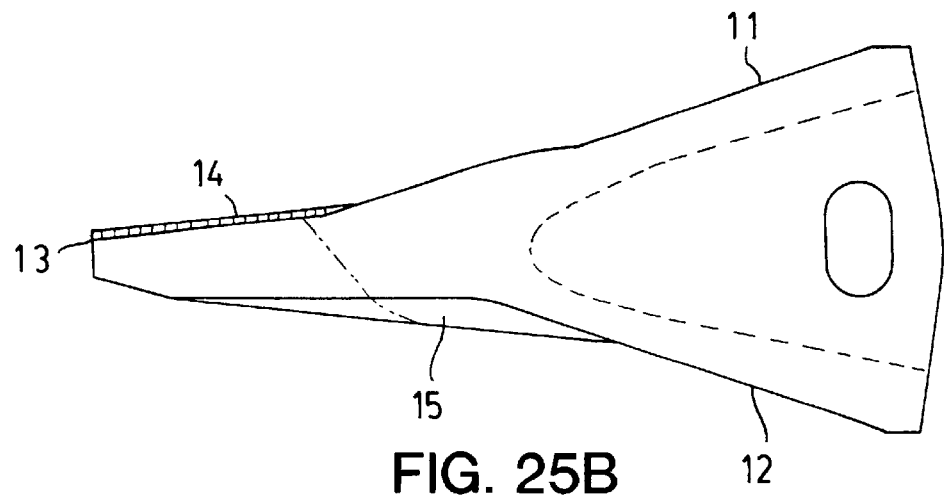
Figure 25C:
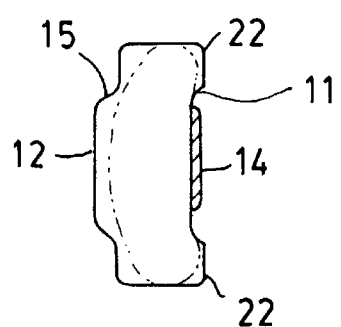

In a bucket tooth for hydraulic shovels as shown in FIGS. 25(*a*) to 25(*c*) in which the top face 11 and the bottom face 12 meet each other at the tip to form the digging edge 13, the wear-resistant overlay 14 was formed with the same overlaying process as that of Example 9 so as to extend backward from the digging edge 13 on the top face 11. The width of the wear-resistant overlay 14 was narrower than that of the central protuberance 15 formed on the bottom face 12. It should be noted that in the bucket tooth of this example, the wear-resistant overlay 14 was formed so as to cover the entire width of the digging edge 13 at the tip thereof and so as to cover only the middle portion in the area behind the entirely covered area, as shown in FIG. 25(*a*). The provision of the wear-resistant overlay 14 running over the entire width of the tip of the digging edge 13 allows the bucket tooth to be kept in a spade-like shape during the initial stage of operation so that it can dig the ground with high efficiency. In the cross-section of the part indicated by the arrows of FIG. 25(*a*), portions on both sides of the wear-resistant overlay 14 were raised, forming side protuberances 22 as shown in FIG. 25(*c*) so that the wear-resistant overlay 14 was positioned within a groove. FIG. 25(*a*) is a plan view of the bucket tooth with the top face 11 being viewed from above, FIG. 25(*b*) is a side view, and FIG. 25(*c*) is a sectional view taken in the direction of the arrows in FIG. 25(*a*). The part of the bucket tooth enclosed by the broken lines in the figures is hollow.

Evaluation

The bucket tooth thus prepared was used for digging bauxite for 100 hours. The shape of wear in the bucket tooth after 100-hour operation is indicated by the two-dot-chain lines in FIGS. 25(*a*) to 25(*c*). As can be seen from these figures, the tip of the bucket tooth was not rounded but kept sharp, with the side protuberances 22 remaining after abrasion. This allowed the bucket tooth of this example to be kept in a spade-like shape which was suited for a bucket tooth for hydraulic shovels and provided easy digging operation.

EXAMPLE 13
(bucket tooth for hydraulic shovels-2-(side tooth))

Structure

Figure 26A:
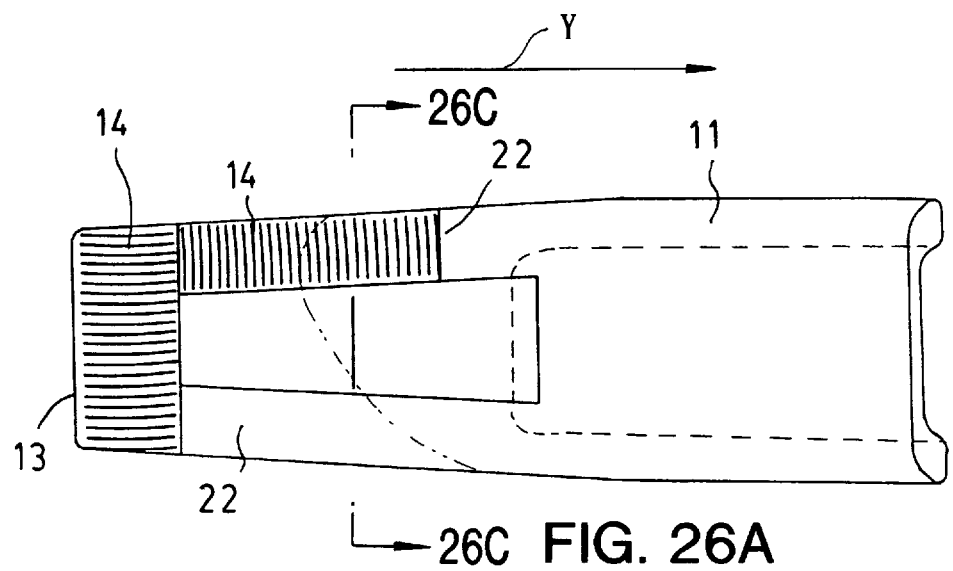
FIGS. 26(a) to 26(c) are a plan view, side view and sectional view taken in the direction of the arrows of FIG. 26(a), respectively, of a bucket tooth for hydraulic shovels on which a wear-resistant overlay prepared in Example 13 is formed.
Figure 26B:
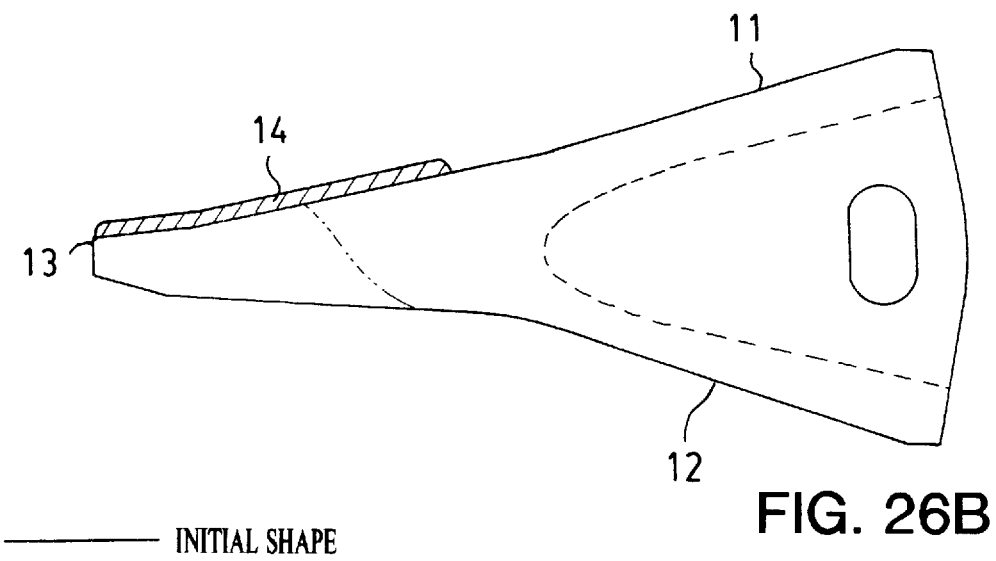
Figure 26C:
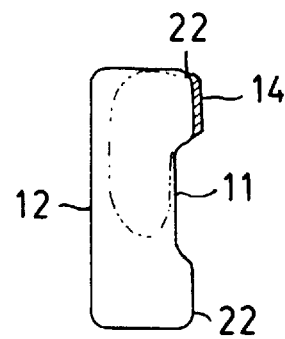

In a bucket tooth for hydraulic shovels as shown in FIGS. 26(*a*) to 26(*c*) in which the top face 11 and the bottom face 12 meet each other at the tip to form the digging edge 13, the wear-resistant overlay 14 was formed with the same overlaying process as that of Example 9 so as to extend backward from the digging edge 13 on the top face 11. It should be noted that in the bucket tooth of this example, the wear-resistant overlay 14 was formed so as to cover the entire width of the digging edge 13 at the tip thereof and so as to cover only one side in the area behind the entirely covered area, as shown in FIG. 26(a). This is on the ground that the bucket tooth of this example is a side tooth, and the side where the wear-resistant overlay 14 was formed is positioned on the outermost part of the bucket of a hydraulic shovel when it is installed and therefore most liable to wear. The reason why the wear-resistant overlay 14 was formed over the entire width of the tip of the digging edge 13 is that with this arrangement, the good spade-like shape can be kept during the initial stage of operation so that digging can be carried out with high efficiency, like the bucket tooth-1 of Example 12. In the cross-section of the part indicated by the arrows of FIG. 26(a), portions on both sides were raised, forming the side protuberances 22, but the wear-resistant overlay 14 was formed only on one of the side protuberances 22 as shown in FIG. 26(c). FIG. 26(a) is a plan view of the bucket tooth with the top face 11 being viewed from above, FIG. 26(b) is a side view, and FIG. 26(c) is a sectional view taken in the direction of the arrows in FIG. 26(a). The part of the bucket tooth enclosed by the broken lines in the figures is hollow.

Evaluation

The bucket tooth thus prepared was used for digging bauxite for 100 hours. The shape of wear in the bucket tooth after 100-hour operation is indicated by the two-dot-chain lines in FIGS. 26(a) to 26(c). As can be seen from these figures, the tip of the bucket tooth after abrasion was not rounded but kept sharp with its center line offset to one side, so that this example was in a lop-sided spade shape maintaining its deposit height which was good enough to continue digging operation as a side tooth.

EXAMPLE 14

[alternate overlay A (average size of rock and sand D≦15 cm)]

To check the effects of the alternate overlay A, the following alternate overlay was formed on a ripper point for bulldozers and evaluation was conducted.

Figure 22:
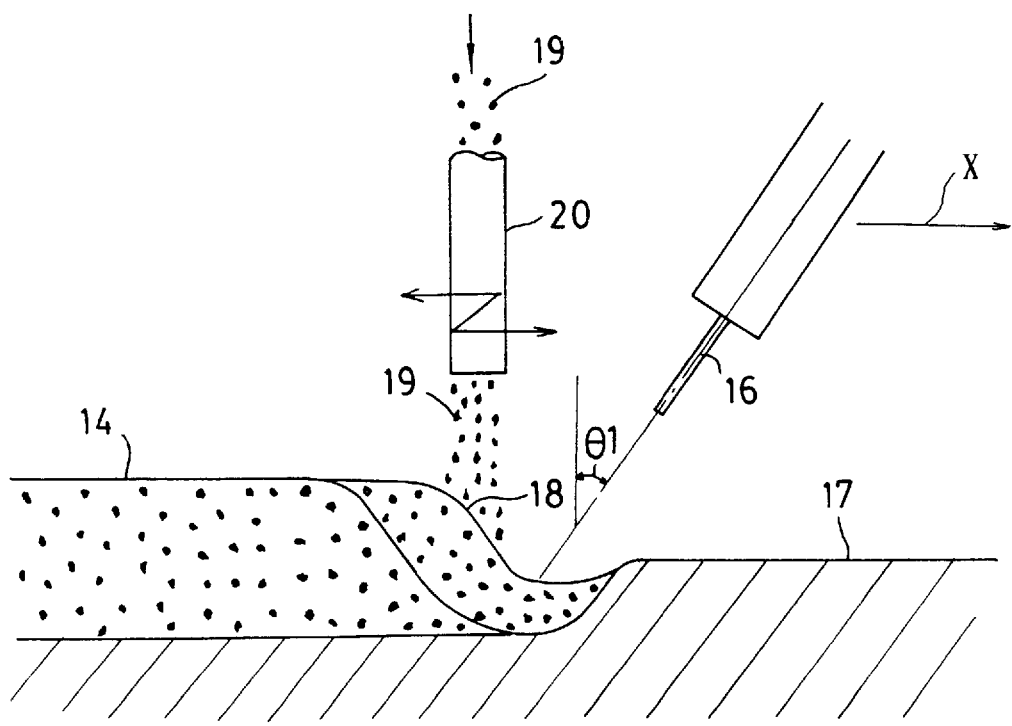
FIG. 22 is a diagrammatic illustration showing an overlay formation mechanism for forming the wear-resistant overlay of Example 9.
Figure 27A:
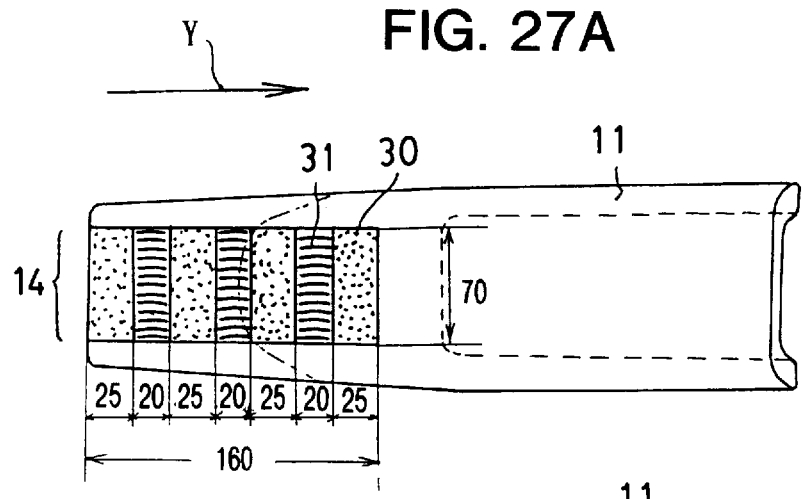
FIGS. 27(a) and 27(b) are a plan view and side view, respectively, of a ripper point for bulldozers on which hard-facing deposit layers and soft-facing deposit layers prepared in Example 14 are alternately overlaid.
Figure 27B:
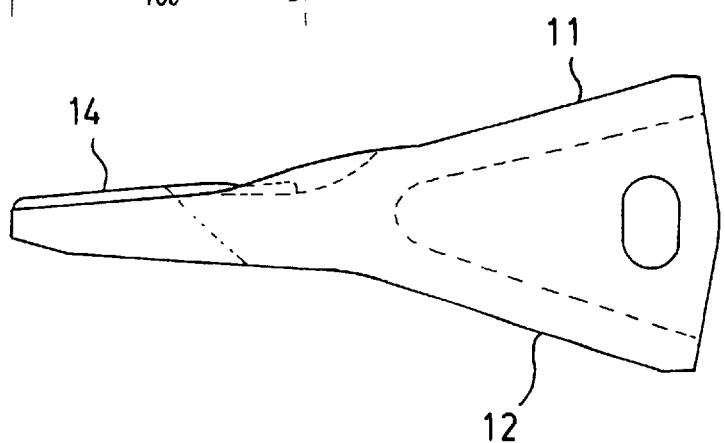

Structure Using the overlay formation mechanism shown in FIG. 22 like Example 9, four hard-facing deposit layers 30 measuring 70×25×6 mm (length×width×thickness) were first formed on a ripper point for bulldozers so as to extend in the direction transverse to the direction of friction Y produced by rock and sand, as shown in FIG. 27(a). Then, three soft-facing deposit layers 31 measuring 70×20×6 mm (length×width×thickness) were formed between the four hard-facing deposit layers 30 by the use of the overlay formation mechanism shown in FIG. 22 under such conditions in which welding current was 295 A, welding voltage was 32 V, welding speed was 25 cm/min, and weaving was 1.5 Hz and the amplitude of oscillation of 4 mm. In this case, the hard particles 19 were not added. The wear-resistant overlay 14 constituted by these hard-facing deposit layers 30 and soft-facing deposit layers 31 was formed as a sample. FIG. 27(a) is a plan view of the ripper point with the top face 11 being viewed from above, and FIG. 27(b) is a side view. The part of the ripper point enclosed by the broken lines in the figures is hollow.

Evaluation

Using a bulldozer to which the above sample had been attached, digging of rock and sand having an average particle diameter of 10 cm was carried out to evaluate the shape of wear and check the presence/absence of chips on the hard-facing deposit layer. After 32-hour digging operation, the ripper point had the shape of wear as indicated by the two-dot chain lines of FIG. 27, but no chips were found in the hard-facing deposit layers 30. As shown in FIG. 27, the ripper point, on which the alternate overlay A according to the invention had been formed, was kept in a sharp shape at its tip even after being subjected to abrasion and free from chips so that it could be continuously used in digging operation.

EXAMPLE 15

[alternate overlay B (average size of rock and sand D≦15 cm)]

To check the effects of the alternate overlay B, the following overlay was formed on a ripper point for bulldozers and then evaluation was conducted.

Structure

Figure 28A:
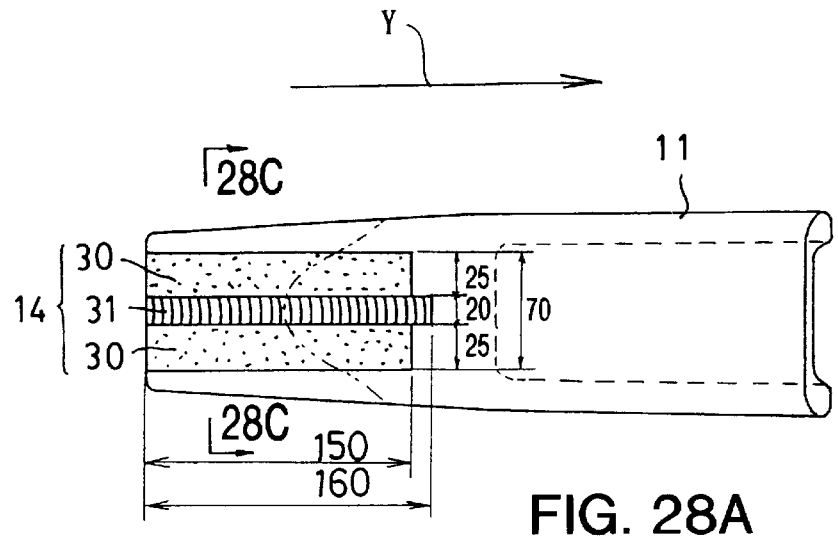
FIGS. 28(a) to 28(c) are a plan view, side view and sectional view taken in the direction of the arrows of FIG. 28(a), respectively, of a ripper point for bulldozers on which hard-facing deposit layers and soft-facing deposit layers prepared in Example 15 are alternately overlaid.
Figure 28B:
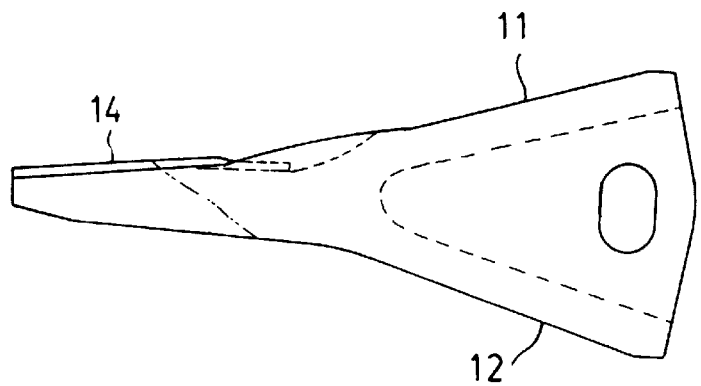
Figure 28C:
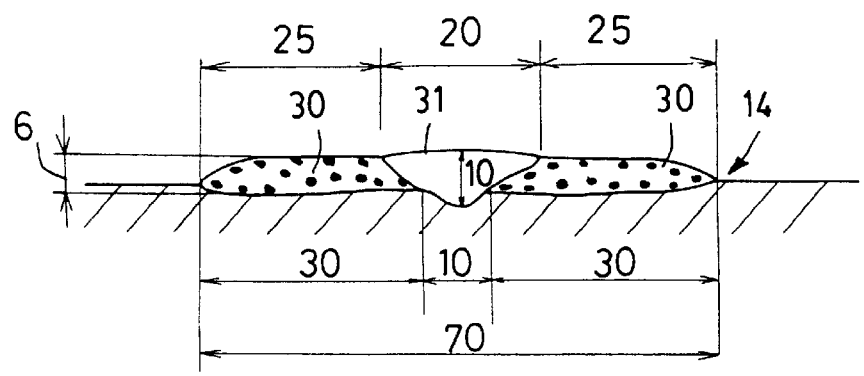
Figure 29A:
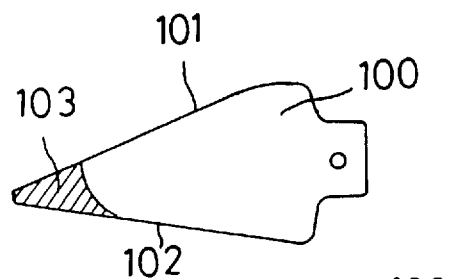
FIGS. 29(a) to 29(c) are wear diagrams of a conventional ripper point for bulldozers.
Figure 29B:
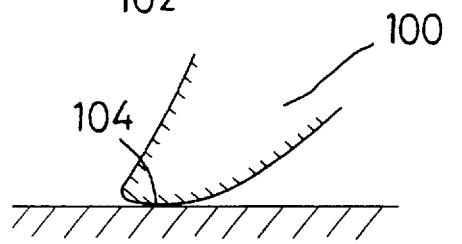
Figure 29C:
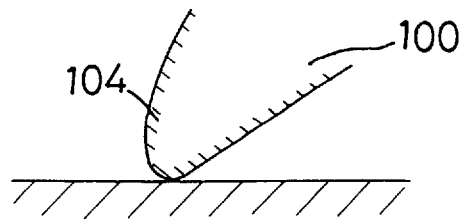

Using the overlay formation mechanism shown in FIG. 22 like Example 9, two hard-facing deposit layers 30 measuring 25×150 mm (width×length) were first formed on a ripper point for bulldozers so as to run in the direction Y of friction produced by rock and sand, as shown in FIG. 28(a). Then, a soft-facing deposit layer 31 measuring 20×160 mm (width×length) were formed between the two hard-facing deposit layers 30 by the use of the overlay formation mechanism shown in FIG. 22 under the same conditions as those of Example 14 without adding the hard particles 19. The wear-resistant overlay 14 constituted by these hard-facing deposit layers 30 and soft-facing deposit layers 31 was prepared as a sample. FIG. 28(a) is a plan view of the ripper point with the top face 11 being viewed from above, and FIG. 28(b) is a side view. The part of the ripper point enclosed by the broken lines in the figures is hollow. FIG. 28(c) is a sectional view taken in the direction of the arrows in FIG. 28(a). As shown in FIGS. 28(a) and 28(c), the cross-section of each hard-facing deposit layer 30 of this example was substantially in the form of a trapezoid having a width of 25 mm at the upper side, a width of 30 mm at the lower side and thickness of 6 mm. The spacing between the two hard-facing deposit layers 30 was 20 mm at the upper side and 10 mm at the lower side. Accordingly, the soft-facing deposit layer 31 substantially takes the form of an inverted triangle in cross-section, the inverted triangle having a width of 20 mm at the upper side and height of 10 mm.

Evaluation

By a bulldozer to which the above sample had been attached, a rock bed of non-blasted chert was ripped to evaluate the shape of wear and check the presence/absence of chips on the hard-facing deposit layer. Note that the size of the rock to be ripped was 10 to 80 cm (average size was approximately 40 cm). After 2-hour digging operation, the ripper point had the shape of wear as indicated by two-dot chain lines of FIGS. 28(a) and 28(b) but no chips were found in the hard-facing deposit layers 30. The ripper point having "the alternate overlay B" according to the invention was not chipped and kept in a sharp shape at its tip after abrasion even when ripping large-sized rock so that it can be suited for use in prolonged digging operation.

When the wear-resistant overlay 14 constituted by the alternate overlay A or B described above is formed on the bottom face of a ripper point for bulldozers or of a bucket tooth for hydraulic shovels, the same effect as that of the above examples, that is, insusceptibility to chipping of the hard-facing deposit layers can be achieved and moreover, wear resistance can be increased.

According to the invention, the part of the molten metal to which hard particles have been supplied is solidified without precipitation of the hard particles in the molten weld pool, so that an overlay can be obtained, which contains the hard particles uniformly dispersed therein and therefore exhibits desired high wear resistance. Even if the surface of the base material on which such an overlay is to be formed is arranged in a horizontal, upright or whatever inclined position, the hard particles can be dispersed in the optimum dispersed condition by adjusting the position where the hard particles are fed to the molten metal. The use of the second particles in addition to the hard particles ensures more positive prevention of precipitation of the hard particles. Further, by adjusting the relationship among the densities of the molten metal of the molten weld pool, the hard particles and the second particles, the hard particles can be more uniformly dispersed in the overlay to ensure superior wear resistance. By adding the second particles, the hardness, toughness, susceptibility to cracking and other features of the overlay can be adjusted.

In the wear-resistant composite member of the invention in which the hard-facing deposit layers run in a stripe pattern in the direction of friction produced by rock and sand, the hard-facing deposit layers are insusceptible to chipping so that high wear resistance can be ensured for a long time. In the wear-resistant composite member of the invention in which the soft-facing deposit layers are arranged in an alternate fashion with the hard-facing deposit layers, excellent wear resistance can be achieved for a long period according to one-sided size distribution of rock and sand so that rock cutting operation can be efficiently carried out. In addition, particles produced by crushing used cutting tools may be used for the wear-resistant composite members, which leads to improved economy.

The preferable method for producing the wear-resistant composite members of the invention is such that the hard-facing deposit layers containing the hard particles are first overlaid and then the soft-facing deposit layers are so overlaid that the hard particles are dissolved out from the hard-facing deposit layers into the soft-facing deposit layers. Overlaying in this order enables it to produce wear-resistant composite members in which not only are the hard-facing deposit layers excellent in wear resistance but also the soft-facing deposit layers exhibit improved hardness due to the hard particles dissolved therein besides toughness. By virtue of this arrangement, such an undesirable situation that only the soft-facing deposit layers are worn out can be prevented when digging operation is carried out on the ground containing fine particles such as sand.

In the wear-resistant composite members of the invention, the tip of the wear-resistant overlay provides a sharp digging edge at all times so that good penetration hardness can always be kept in relation to the ground. The wear-resistant overlay may be formed on a protuberance that extends backward from the digging edge. This protuberance is thick by itself, and moreover, with the wear-resistant overlay being formed on this protuberance, it is obviously more insusceptible to wear compared to other areas, so that it can be kept in a conical shape which runs along the wear-resistant overlay extending backward from the digging edge. Further, there may be formed a protuberance on the bottom face at a position corresponding to the above protuberance. The protuberance on the bottom face serves as wear allowance, permitting the conical shape to last for long.

The wear-resistant overlay, which is located in other areas than both sides of the top face, may be formed within a groove. This makes both sides of the top face thicker and more unlikely to wear away than other areas so that the wear-resistant composite member can be kept in a spade-like shape which is suitable for digging the ground. The bottom face of such a composite member may be provided with a protuberance which is located in the position corresponding to the groove formed on the top face. This protuberance on the bottom face also serves as wear allowance so that the wear-resistant composite member can be used for a long time, being kept in the spade shape.

The wear-resistant composite members may have a wear-resistant overlay in which the hard-facing deposit layers containing hard particles and the soft-facing deposit layers made from soft material are aligned alternately in the direction of friction produced by rock and sand or in the direction transverse to the direction of friction. This makes the wear-resistant overlay insusceptible to damage and therefore prolongs the service life of the wear-resistant composite members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A wear-resistant overlay forming method wherein hard particles are supplied to a molten weld pool that is that is formed on a surface of a base material by an arc generated from a tip of an arc electrode to form a wear resistant overlay containing the hard particles on the surface of the base material, comprising:

inclining the surface of the base material with respect to a horizontal plane by an angle $\alpha$, wherein $25° \leq \alpha \leq 90°$;

establishing a welding direction of the base material with respect to the tip of the arc electrode wherein the molten material flows downward away from the tip due to gravity;

generating the arc from the tip of the arc electrode while the tip is oriented at an angle $\theta$, wherein $\theta \geq 90°$ with respect to the welding direction to create the molten weld pool, which molten weld pool flows by gravity downwardly with respect to the weld direction;

supplying the hard particles to the molten metal at a location upstream of the location of impingement of the arc with the molten metal pool when $25° \leq \alpha < 90°$; and supplying the hard particles to the molten metal at a location coincident with the location of impingement when $\alpha = 90°$.

2. A wear-resistant overlay forming method wherein hard particles are supplied to a molten weld pool that is formed on a base material by an arc generated from an arc electrode having a longitudinal axis to form a wear-resistant overlay resulting in a hard-facing deposit layer containing the hard particles on the base material, the method comprising:

inclining a surface of the base material in a welding direction at an angel which ranges from not less than 0° to less than 25° with respect to a horizontal plane;

inclining the arc electrode so that the longitudinal axis thereof is at a predetermined angle relative to a line perpendicular to the surface of the base material, such that the tip of the electrode is oriented downstream of the welding direction; and supplying the hard particles to part of the molten metal of the molten weld pool, said part of the molten metal being raised by the action of the arc and being located behind an intersecting position in the welding direction and flowing downward due to gravity because the base material is inclined, the intersecting position being a position where an extension of the axis of the arc electrode intersects the surface of the base material.

3. The wear-resistant overlay forming method as claimed in claim 2, wherein second particles are fed to the part of the molten metal in addition to the hard particles.

4. A wear-resistant composite member for cutting and removing rock and sand, wherein the hard-facing deposit layers containing hard particles formed by the wear-resistant overlay forming methods as set forth in claim 2 and soft-facing deposit layers made from soft material formed on a base material, such that the hard-facing deposit layers and the soft-facing deposit layers run in a stripe pattern aligned in the direction of friction.

5. The wear-resistant composite member for cutting and removing rock and sand as claimed in claim 4, wherein a top face and a bottom face meet each other at a tip of the member to form a digging edge, and wherein a wear-resistant overlay is formed on at least either the top face or bottom face so as to extend backward from the digging edge, the wear-resistant overlay being designed such that the hard-facing deposit layers and the soft-facing deposit layers run in a stripe pattern in the direction transverse to the direction of friction produced by rock and sand, being alternately aligned in the direction of friction.

6. The wear-resistant composite member as claimed in claim 4, wherein particles produced by crushing used cutting tools are used as the hard particles.

7. A wear-resistant composite member for cutting and removing rock and sand, wherein hard-facing deposit layers containing hard particles is formed by the wear-resistant overlay forming methods as set forth in claim 2 and soft-facing deposit layers made from soft material are formed on a base material, such that the hard-facing deposit layers and the soft-facing deposit layers run in a stripe pattern in a direction of friction produced by the rock and sand.

8. The wear-resistant composite member for cutting and removing rock and sand as claimed in claim 7, wherein a top face and a bottom face meet each other at a tip of the member to form a digging edge, and wherein a wear-resistant overlay is formed on at least either the top face or bottom face so as to extend backward from the digging edge, the wear-resistant overlay being designed such that the hard-facing deposit layer(s) and the soft-facing deposit layer(s) run in a stripe pattern in the direction of friction produced by rock and sand, being alternately aligned in the direction transverse to the direction of friction.

9. The wear-resistant composite member formed by the method as claimed in claim 2 for cutting and removing rock and sand, wherein the wear-resistant overlay extends backward from a digging edge and is formed in a groove formed on a top face of the member so as to extend backward from the digging edge, and wherein a protuberance is formed on a bottom face of the composite member so as to extend backward from the digging edge, the protuberance being in a position corresponding to the groove formed on the top face.

10. A wear-resistant composite member for cutting and removing rock and sand, wherein hard-facing deposit layers containing hard particles are formed on a base material by the wear-resistant overlay forming methods as set forth in claim 2, such that the hard-facing deposit layers are arranged in a stripe pattern so as to run in a direction of friction produced by rock and sand.

11. A wear-resistant composite member for cutting and removing rock and sand, wherein a top face and a bottom face meet each other at a tip of the member to form a digging edge, and wherein a wear-resistant overlay in which hard-facing deposit layer(s) containing hard particles and soft-facing deposit layer(s) made from soft material run in a stripe pattern in a direction transverse to a direction of friction produced by rock and sand, being alternately aligned in the direction of friction, is formed only on the top face so as to extend backward from the digging edge.

12. A wear-resistant composite member for cutting and removing rock and sand, wherein a top face and a bottom face meet each other at a tip of the member to form a digging edge, and wherein a wear-resistant overlay in which hard-facing deposit layer(s) containing hard particles and soft-facing deposit layer(s) made from soft material run in a stripe pattern in a direction of friction produced by rock and sand, being alternately aligned in a direction transverse to the direction of friction, is formed only on the top face so as to extend backward from the digging edge.

* * * * *